(12) United States Patent
Varia et al.

(10) Patent No.: US 11,006,127 B2
(45) Date of Patent: *May 11, 2021

(54) SYSTEM AND METHOD FOR FOVEATED COMPRESSION OF IMAGE FRAMES IN A SYSTEM ON A CHIP

(71) Applicant: QUALCOMM INCORPORATED, San Diego, CA (US)

(72) Inventors: Meghal Varia, North York (CA); Serag Gadelrab, Markham (CA); Wesley James Holland, La Jolla, CA (US); Joseph Cheung, San Diego, CA (US); Dam Backer, San Diego, CA (US); Tom Longo, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,818

(22) Filed: Sep. 30, 2019

(65) Prior Publication Data

US 2020/0092564 A1 Mar. 19, 2020

Related U.S. Application Data

(63) Continuation of application No. 15/727,517, filed on Oct. 6, 2017, now Pat. No. 10,511,842.

(51) Int. Cl.
*H04N 19/162* (2014.01)
*H04N 19/167* (2014.01)
(Continued)

(52) U.S. Cl.
CPC ....... *H04N 19/162* (2014.11); *G06F 12/0207* (2013.01); *H04N 5/917* (2013.01);
(Continued)

(58) Field of Classification Search
None
See application file for complete search history.

(56) References Cited

U.S. PATENT DOCUMENTS 6,252,989 B1 6/2001 Geisler et al.
6,351,335 B1 2/2002 Perlin
(Continued)

FOREIGN PATENT DOCUMENTS

TW 200837423 A 9/2008
TW 200845733 A 11/2008
(Continued)

OTHER PUBLICATIONS

Strategies for Foveated Compression and Transmission. Funt et al. (Year: 2016).*

(Continued)

*Primary Examiner* — Delomia L Gilliard
(74) *Attorney, Agent, or Firm* — Qualcomm Incorporated

(57) ABSTRACT

An exemplary method for intelligent compression uses a foveated-compression approach. First, the location of a fixation point within an image frame is determined. Next, the image frame is sectored into two or more sectors such that one of the two or more sectors is designated as a fixation sector and the remaining sectors are designated as foveation sectors. A sector may be defined by one or more tiles within the image frame. The fixation sector includes the particular tile that contains the fixation point and is compressed according to a lossless compression algorithm. The foveation sectors are compressed according to lossy compression algorithms. As the locations of foveation sectors increase in angular distance from the location of the fixation sector, a compression factor may be increased.

32 Claims, 17 Drawing Sheets

(51) Int. Cl.
*H04N 19/174* (2014.01)
*H04N 19/115* (2014.01)
*H04N 19/119* (2014.01)
*G06F 12/02* (2006.01)
*H04N 19/12* (2014.01)
*H04N 19/172* (2014.01)
*H04N 19/46* (2014.01)
*H04N 5/917* (2006.01)

(52) U.S. Cl.
CPC ......... *H04N 19/115* (2014.11); *H04N 19/119* (2014.11); *H04N 19/12* (2014.11); *H04N 19/167* (2014.11); *H04N 19/172* (2014.11); *H04N 19/174* (2014.11); *H04N 19/46* (2014.11); *G06F 2212/1041* (2013.01); *G06F 2212/401* (2013.01); *G06F 2212/502* (2013.01)

(56) References Cited

U.S. PATENT DOCUMENTS

| | | | |
|---|---|---|---|
| 6,879,266 B1* | 4/2005 | Dye | G06F 12/08 341/51 |
| 7,167,519 B2 | 1/2007 | Comaniciu et al. | |
| 9,230,302 B1 | 1/2016 | Owechko et al. | |
| 2010/0315215 A1* | 12/2010 | Yuda | G08G 1/167 340/435 |
| 2012/0275718 A1* | 11/2012 | Takamori | H04N 19/172 382/238 |
| 2014/0204107 A1* | 7/2014 | Laksono | H04N 19/17 345/547 |
| 2018/0288423 A1* | 10/2018 | Vembar | H04N 19/167 |
| 2019/0110053 A1 | 4/2019 | Varia et al. | |

FOREIGN PATENT DOCUMENTS

| | | | |
|---|---|---|---|
| TW | 201501761 A | 1/2015 | |
| TW | 201600887 A | 1/2016 | |
| TW | 201638723 A | 11/2016 | |
| WO | 2014134828 A1 | 9/2014 | |
| WO | WO-2014134828 A1 * | 9/2014 | ........... H04N 19/102 |
| WO | 2017025483 A1 | 2/2017 | |

OTHER PUBLICATIONS

Funt B., et al., "Strategies for Foveated Compression and Transmission", Jul. 15, 2016 (Jul. 15, 2016), XP055508690, Retrieved from the Internet: URL: https://static.googleusercontent.com/media/research.google.com/en//pubs/archive/46452.pdf [retrieved on Sep. 21, 2018] abstract p. 1, paragraphs 1, 2.
International Search Report and Written Opinion—PCT/US2018/049948—ISA/EPO—dated Nov. 21, 2018.
Taiwan Search Report—TW107128538—TIPO—dated Aug. 6, 2020.

* cited by examiner

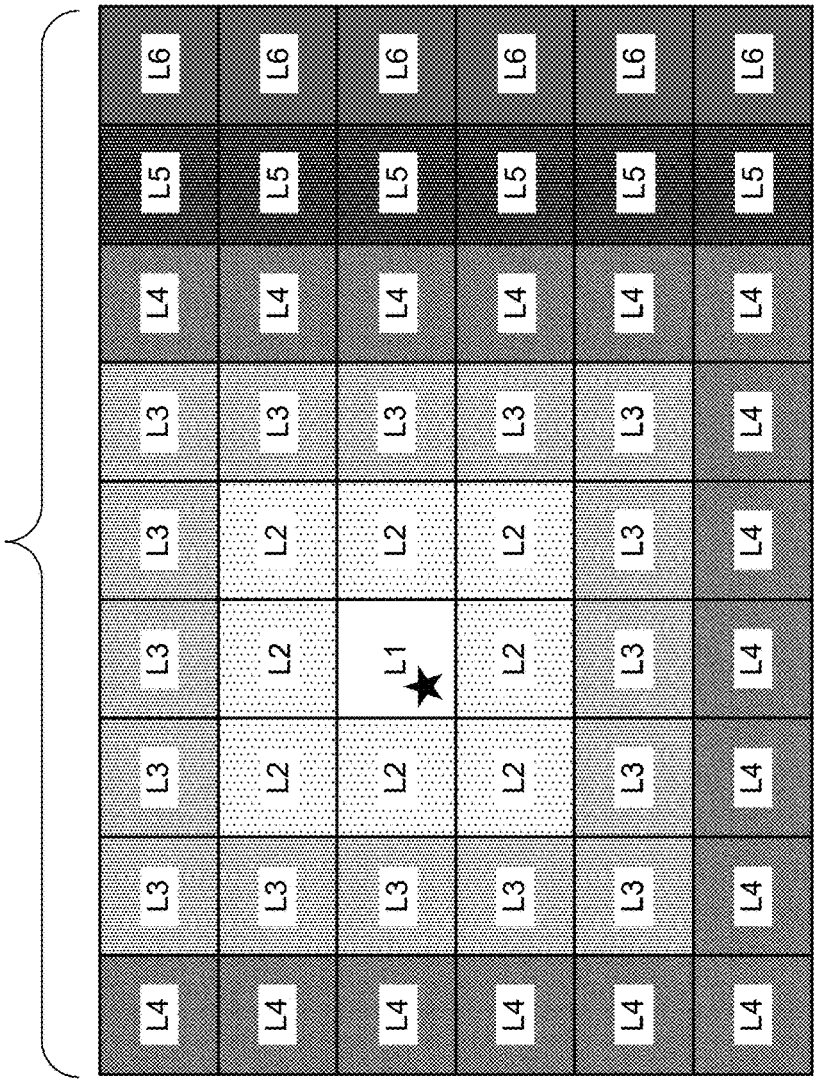
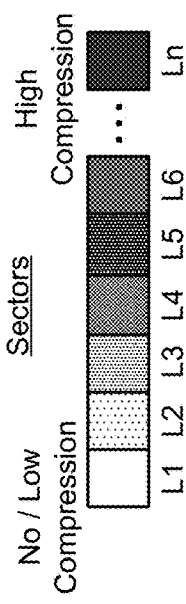
FIG. 8

FIG. 9

LEGEND

★ = Fixation Point

L1 = Lossless compression or Lossy compression w/ low loss factor

L2 = Lossy compression with loss factor higher than L1 loss factor

L3 = Lossy compression with loss factor higher than L2 loss factor

L4 = Lossy compression with loss factor higher than L3 loss factor

L5 = Lossy compression with loss factor higher than L4 loss factor

L6 = Lossy compression with loss factor higher than L5 loss factor

Ln = Lossy compression with loss factor higher than L(n-1) loss factor

↑ = direction of increasing compression loss factor for tiles within sector

Sectors: L1 L2 L3 L4 L5 L6 ... Ln
No / Low Compression → High Compression

900 — Sectored Image Frame compressed according to an exemplary Gradated Square-Grid Foveated-Compression Pattern

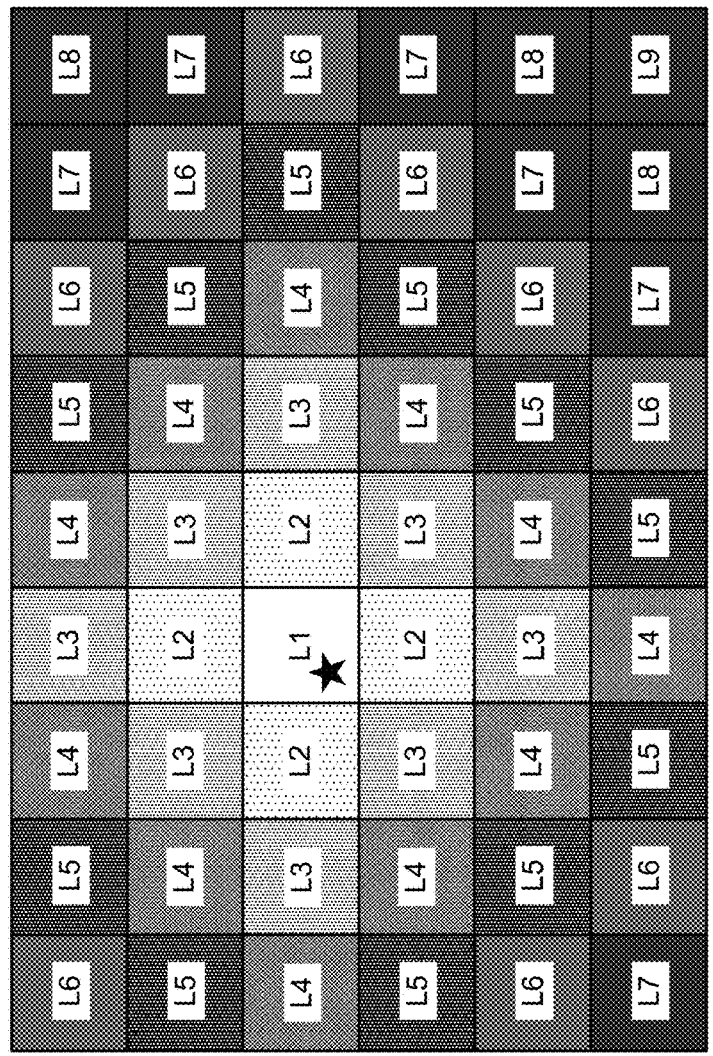
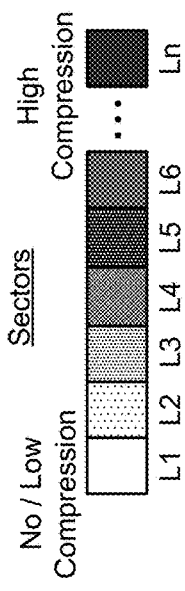
FIG. 10

FIG. 11

LEGEND

★ = Fixation Point

L1 = Lossless compression or Lossy compression w/ low loss factor

L2 = Lossy compression with loss factor higher than L1 loss factor

L3 = Lossy compression with loss factor higher than L2 loss factor

L4 = Lossy compression with loss factor higher than L3 loss factor

L5 = Lossy compression with loss factor higher than L4 loss factor

L6 = Lossy compression with loss factor higher than L5 loss factor

...

Ln = Lossy compression with loss factor higher than L(n-1) loss factor

▲ = direction of increasing compression loss factor for tiles within sector

Sectors

| No / Low Compression | | | | | | High Compression |
|---|---|---|---|---|---|---|
| L1 | L2 | L3 | L4 | L5 | L6 | ... Ln |

1100 — Sectored Image Frame compressed according to an exemplary Gradated Cross-Grid Foveated-Compression Pattern

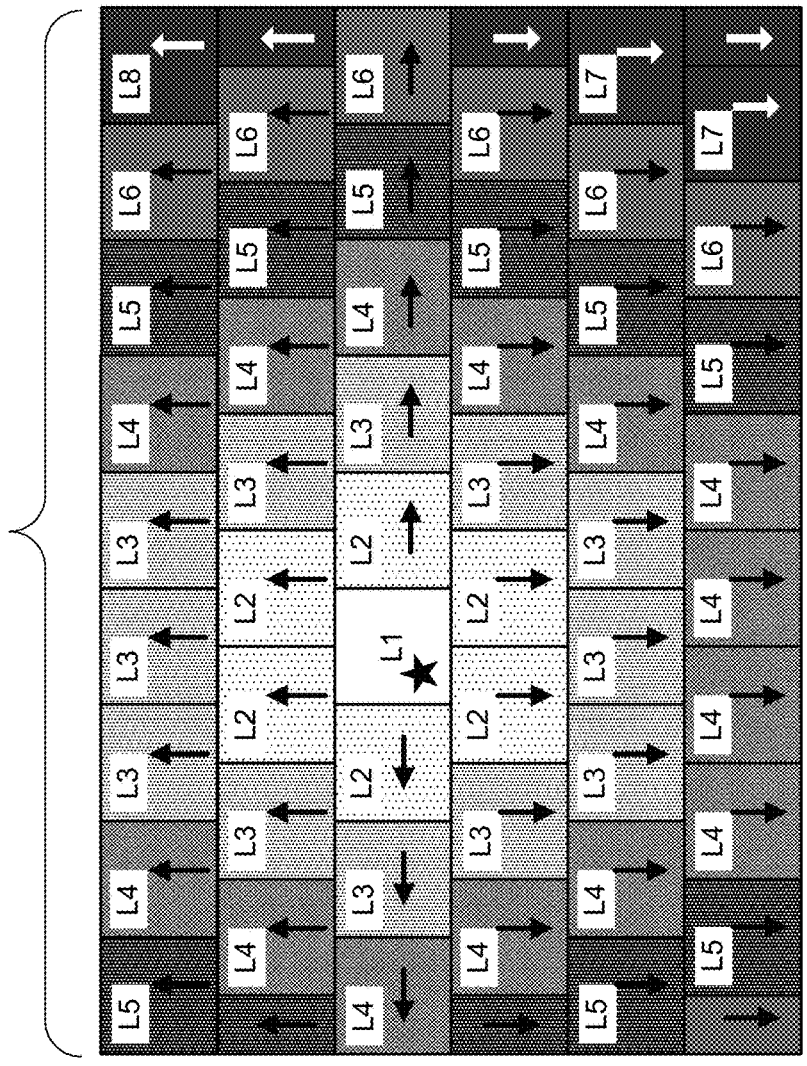
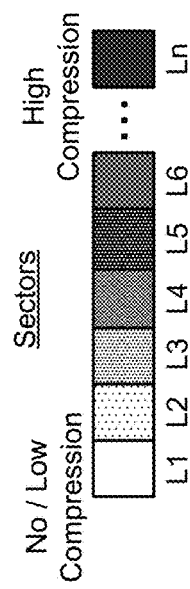
FIG. 13

SYSTEM AND METHOD FOR FOVEATED COMPRESSION OF IMAGE FRAMES IN A SYSTEM ON A CHIP

CROSS-REFERENCE TO RELATED APPLICATION(S)

This application is a continuation application of U.S. patent application Ser. No. 15/727,517, entitled "SYSTEM AND METHOD FOR FOVEATED COMPRESSION OF IMAGE FRAMES IN A SYSTEM ON A CHIP", filed on Oct. 6, 2017, now Pat. No. 10,511,842, which is expressly incorporated by reference herein in its entirety.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices. PCDs commonly contain integrated circuits, or systems on a chip ("SoC"), that include numerous components designed to work together to deliver functionality to a user. For example, a SoC may contain any number of processing engines such as modems, central processing units ("CPUs") made up of cores, graphical processing units ("GPUs"), etc. that read and write data and instructions to and from memory components on the SoC. The data and instructions are transmitted between the devices via a collection of wires known as a bus.

The efficient sizing of bus bandwidth and memory components in a PCD is important for optimizing the functional capabilities of processing components on the SoC and guaranteeing a minimum required quality of service ("QoS") level. Commonly, the utilization of memory capacity and bus bandwidth is further optimized by compressing data so that the data requires less bus bandwidth to transmit and less space in the memory for storage. Not all data/image frames compress with the same efficiency or, for that matter, require the same compression efficiency in order to maintain a suitable QoS, and as such PCD designers are faced with a tradeoff decision—compress using a lossy compression methodology that produces a lower quality output when decompressed and, in return, benefit from a smaller memory component and bus bandwidth requirement or, alternatively, compress using a lossless compression methodology that produces a high quality output when decompressed but requires relatively larger memory components and bus bandwidths to maintain a satisfactory QoS. Either way, designers have to size busses and memory components in view of the "practical worst case" of compression, otherwise they risk reduced QoS as measured by any number of key performance indicators.

Simply stated, current systems and methods for data/ image frame compression known in the art dictate that PCD designers, in order to ensure delivery of an acceptable QoS level, must utilize memory components and bus bandwidths that are oversized for most use cases. Notably, though, a user's visual acuity is highest at the fovea with a quick drop-off in perceivable visual detail outside a region of focus that includes a fixation point. As such, high quality compression of data within an image frame that is associated with a region outside a user's region of focus may not provide a significant positive impact on QoS. Therefore, there is a need in the art for an intelligent compression system and method that leverages knowledge of a user's focal fixation point to compress an image frame in a foveated manner such that a no/low compression, high quality output compression algorithm is used on a frame region associated with user focus while successively higher compression, lower quality output compression algorithms are used on frame regions associated with user peripheral vision.

SUMMARY OF THE DISCLOSURE

Various embodiments of methods and systems for intelligent data compression in a portable computing device ("PCD") are disclosed. An exemplary method begins by determining a fixation point within an image frame. With the fixation point determined, next the image frame is sectored into two or more sectors such that one of the two or more sectors is designated as a fixation sector and the remaining sectors are designated as foveation sectors. A sector may be defined by one or more tiles within the image frame. The fixation sector includes the particular tile that contains the fixation point and is compressed according to a compression algorithm having a low compression factor, such as a lossless compression algorithm. The foveation sectors are compressed according to compression algorithms having a high compression factors relative to the algorithm used to compress the fixation sector. As the locations of foveation sectors increase in angular distance from the location of the fixation sector, embodiments of the solution may increase the compression factor of the algorithm used to compress tiles within the given foveation sectors. In this way, an image frame may be compressed according to a foveated-compression approach. The compressed frame may be stored in memory until later retrieved, decompressed and rendered.

Depending on the embodiment, the image frame may be sectored into a square-grid foveated-compression pattern, a cross-grid foveated compression pattern, a honeycomb compression pattern, etc. Moreover, depending upon embodiment, all tiles in a given sector may be compressed according a single compression algorithm and compression factor or, alternatively, the compression factor may vary for tiles within a given sector (a gradated compression).

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral encompass all parts having the same reference numeral in all figures.

FIG. 8 illustrates an exemplary image frame sectored and compressed according to an embodiment of the solution utilizing an exemplary square-grid foveated-compression pattern;

FIG. 9 illustrates an exemplary image frame sectored and compressed according to an embodiment of the solution utilizing an exemplary gradated square-grid foveated-compression pattern;

FIG. 10 illustrates an exemplary image frame sectored and compressed according to an embodiment of the solution utilizing an exemplary cross-grid foveated-compression pattern;

FIG. 11 illustrates an exemplary image frame sectored and compressed according to an embodiment of the solution utilizing an exemplary gradated cross-grid foveated-compression pattern;

FIG. 13 illustrates an exemplary image frame sectored and compressed according to an embodiment of the solution utilizing an exemplary gradated honeycomb foveated-compression pattern;

DETAILED DESCRIPTION

Figure 1A:
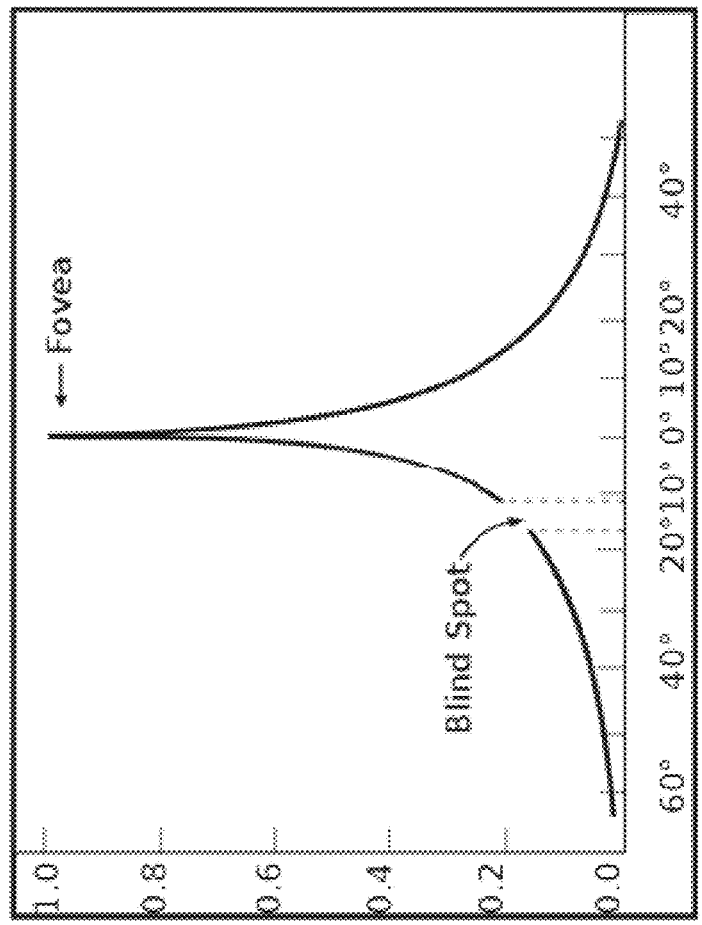
FIG. 1A is a chart that illustrates how acuity reduces as a function of distance (or angle) from the user's fovea.

The word "exemplary" is used herein to mean serving as an example, instance, or illustration. Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, reference to "DRAM" or "DDR" memory components will be understood to envision any of a broader class of volatile random access memory ("RAM") and will not limit the scope of the solutions disclosed herein to a specific type or generation of RAM. That is, it will be understood that various embodiments of the systems and methods provide a solution for managing transactions of data that have been compressed according to lossless and/or lossy compression algorithms and are not necessarily limited in application to compressed data transactions associated with double data rate memory. Moreover, it is envisioned that certain embodiments of the solutions disclosed herein may be applicable to DDR, DDR-2, DDR-3, low power DDR ("LPDDR") or any subsequent generation of DRAM.

As used in this description, the terms "component," "database," "module," "block," "system," and the like are intended to refer generally to a computer-related entity, either hardware, firmware, a combination of hardware and software, software, or software in execution, unless specifically limited to a certain computer-related entity. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or chip may be comprised of one or more distinct processing components generally referred to herein as "core(s)."

In this description, the terms "engine," "processing engine," "processing component," "producer" and the like are used to refer to any component within a system on a chip ("SoC") that generates data and/or image frames and transfers them over a bus to, or from, a memory component. As such, an engine may refer to, but is not limited to refer to, a CPU, DSP, GPU, modem, controller, camera, video recorder, etc.

In this description, the term "bus" refers to a collection of wires through which data is transmitted from a processing engine to a memory component or other device located on or off the SoC. It will be understood that a bus consists of two parts—an address bus and a data bus where the data bus transfers actual data and the address bus transfers information specifying location of the data in a memory component (i.e., address and associated metadata). The terms "width" or "bus width" or "bandwidth" refers to an amount of data, i.e. a "chunk size," that may be transmitted per cycle through a given bus. For example, a 16-byte bus may transmit 16 bytes of data at a time, whereas 32-byte bus may transmit 32 bytes of data per cycle. Moreover, "bus speed" refers to the number of times a chunk of data may be transmitted through a given bus each second. Similarly, a "bus cycle" or "cycle" refers to transmission of one chunk of data through a given bus.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") and fifth generation ("5G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In this description, the terms "lossless" and "lossy" refer to different categories of compression algorithms or methodologies and are not meant to refer to any specific algorithm. Whether a given specific compression algorithm is "lossless" or "lossy" would be recognized by one of ordinary skill in the art. Generally speaking, and as one of ordinary skill in the art would understand, "lossless" and "lossy" are terms that describe whether or not, in the compression of a data set or image frame, all original data can be recovered when the file is decompressed. With "lossless" compression, every single bit of data that was originally in the uncompressed frame remains after the frame is decompressed, I.e., all of the information is completely restored. The Graphics Interchange File ("GIF") is an exemplary image format that provides a lossless compression. By contrast, lossy compression algorithms reduce a frame or data set by permanently eliminating certain information, especially redundant information. As such, when a file compressed with a lossy algorithm is decompressed, only a part of the original information is still there (although the user experience may not suffer for it). Lossy compression algorithms may be suitable for video and sound based use cases, for example, as a certain amount of information loss may not be detected by a user. The JPEG image file is an exemplary image format that provides a lossy compression. Using a lossy compression algorithm, designers can decide how much loss to introduce (according to a compression factor associated with given lossy compression algorithms) and make a trade-off between file size and output image quality. The higher the compression factor for a lossy compression algorithm, the relatively smaller the size of the resultant compressed file and the lower the output image quality when the file is later decompressed. Similarly, the lower the compression factor for a lossy compression algorithm, the relatively larger the resultant compressed file and the higher the output image quality (approaching or meeting the output quality of lossless compression) when the file is later decompressed.

In this description, the terms "image," "data set," "data," "frame," "image frame," "buffer," "file" and the like are used interchangeably. Although embodiments of the solution are described herein within the context of a producer component generating a data set in the form of an image frame, such as may be generated by a camera or video subsystem, it will be understood that the solution described herein is not limited in application to an image frame. Rather, it is envisioned that embodiments of the solution may be applicable in any use case that may benefit from compression of data in general.

In this description, the terms "tile" and "unit" are used interchangeably to refer to a block of pixels that forms a subset of a larger block of data such as an image frame. A "tile" or "unit," depending upon embodiment of the solution, may exhibit any aspect ratio suitable for the embodiment and, as such, one of ordinary skill in the art will appreciate that a "tile" or "unit" within an image frame is not necessarily limited to having a "square" aspect ratio—I.e., depending upon embodiment a "tile" or "unit" may be rectangular.

In this description, the terms "sector" and "foveation sector" are used interchangeably to refer to a portion of an image frame that is comprised of one or more tiles. Within the context of the solution described herein, a "sector" may be any shape or size so long as it is divisible by one or more whole tiles.

In this description, the term "fixation point" refers to the location within an image frame determined to require a relatively highest output quality after decompression. The "fixation point" may correspond to a portion of an image frame perceived by a user's fovea or within a range defined by some standard deviation from the fovea (see following FIG. 1A), as opposed to portions perceived within a user's peripheral field of vision. The "fixation point" may correspond to a given sector, or possibly a given tile, of an image frame.

In this description, the term "saccades" or "saccade" refers to a relatively rapid movement of a user's eye between fixation points. Whether or not a user is perceiving an image subject to saccades, i.e. whether a user is "rapidly" switching back and forth from one fixation point to another, may be definable depending upon the particular embodiment of the solution.

In this description, the term "uncompressed" refers to a frame in its original, pre-compression state whereas the term "decompressed" refers to a frame that was first compressed from its uncompressed state using a compression algorithm and then later decompressed. Depending on the class of compression used, the data set of a decompressed frame may be identical to the data set of the frame's original, uncompressed state (lossless compression) or it may not (lossy compression).

As would be understood by one of ordinary skill in the art of frame compression, the resulting compression ratio generated by any given compression algorithm inevitably varies from frame to frame. The texture level, light condition, ISO setting, etc. in a given frame of a digitally captured video sequence may differ significantly from a different frame in the same sequence and, as such, the relative levels of compression for the frames will also differ significantly. For example, a frame in a video sequence that captures a couple of people standing and talking may be more likely to experience a high level of compression than a subsequent frame that captures the same couple of people sprinting down a street away from an explosion in the background. Simply stated, the frame with the running subjects and explosion just has a lot of data, the loss of which in compression cannot be afforded if the frame is to deliver a high quality rendering when later decompressed.

With enough large processing components, memory components, bus bandwidths and power supplies, PCD designers would not have to consider the tradeoffs of one compression algorithm versus another—they'd simply produce frames at the highest quality level possible and compress, if at all, with a lossless compression algorithm. That way, they could be assured that the QoS experienced by a user was always at its maximum possible level. But, the realities of limited form factors for PCDs force designers to weigh the tradeoffs of various compression algorithms when sizing components in the PCD to deliver a minimum acceptable QoS for all predicted use cases.

Consequently, PCD designers have typically used the "practical worst case" compression ratio when evaluating the bandwidth requirements and component sizes needed for all known use cases. The practical worst case, therefore, is the compression ratio required to maintain a minimum acceptable QoS for the most difficult frames needing compression (e.g., the frame that captures people sprinting down a street away from an explosion in the background). Using the practical worst case, designers make conservative sizing selections to ensure that the memory and bus bandwidth will always be sufficient regardless of a given frame's complexity. Notably, if the designers undersize the bandwidth, the resulting latency in processing during a problematic use case may cause frame drops, a reduction in frame per second ("FPS") rate, or the like. Conversely, for all use cases that are better than the practical worst case, the system may be significantly oversized for delivery of the minimum acceptable QoS resulting in a higher cost system and/or higher power consumption by the system.

Advantageously, embodiments of the solution provide designers with the ability to "right size" producers, memory components and bus bandwidths to optimize power consumption and QoS levels across a range of use cases. Notably, embodiments of the solution leverage knowledge of a fixation point within a frame, i.e. the area of a frame upon which a user is focused, to apply a mixed mode compression approach that uses lossless compression (or, possibly, no compression) for a sector within a frame that includes the fixation point while using lossy compression for remaining sectors of the frame. In doing so, and as will be explained more thoroughly below in view of the figures, embodiments smartly provide for use of lossless and lossy compression algorithms in compression of a given image frame, thereby reducing the processing and bus bandwidth required for a practical worst case.

For example, returning to the use case of an image frame within a video sequence that captures a couple of people sprinting down a street away from an explosion in the background, embodiments of the solution utilize knowledge as to where in the frame a user is focused (e.g., the faces of the couple, the background explosion, a car in the way, etc.) and, instead of applying lossless compression across the entire frame, applies lossless compression on only the portion of the frame that is the subject of user focus. In this way, data within the frame that is perceived outside of the user's fovea region, i.e. within the user's expanded peripheral field of vision, and thus providing little or no positive impact on QoS when compressed according to a lossless algorithm, may be compressed (and later decompressed) according to lossy compression algorithms. Further, it is envisioned that some embodiments may even recognize the location of the user's blind spot and use a very high compression algorithm to compress data associated with the blind spot (or, alternatively, discard the data associated with the blind spot altogether instead of compressing it).

Figure 1B:
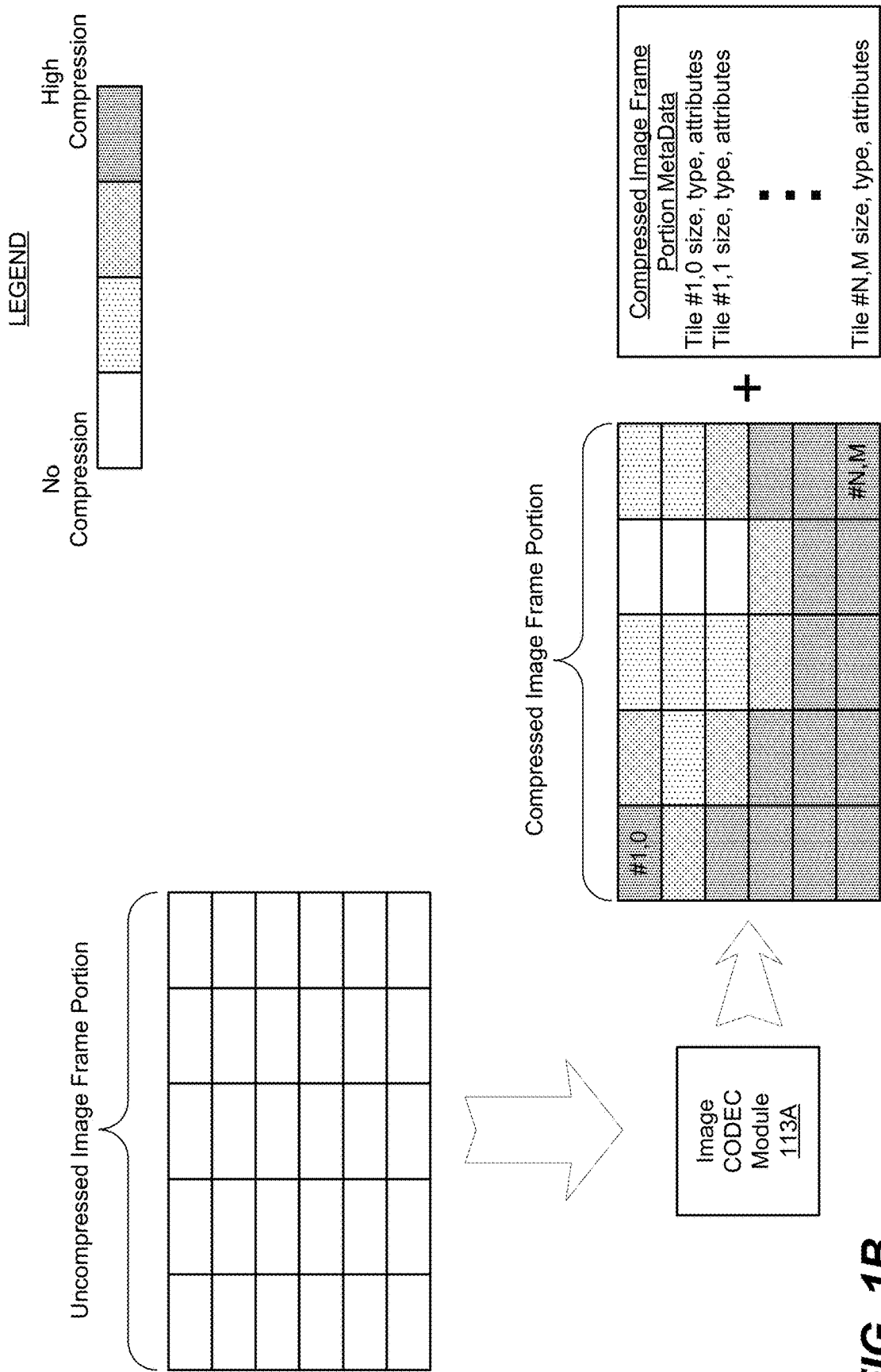
FIG. 1B illustrates the effects of compressing an image frame composed of multiple data sub-units or tiles.

Turning to FIG. 1B, illustrated are the effects of compressing an image frame composed of multiple data sub-units or tiles. In this description, the various embodiments may be described within the context of an image frame, or portion of an image frame, made up of 256-byte tiles. Notably, however, it will be understood that the 256-byte tile sizes, as well as the various compressed data transaction sizes, are exemplary in nature and do not suggest that embodiments of the solution are limited in application to 256-byte tile sizes. Moreover, it will be understood that reference to any specific minimum access length ("MAL") or access block size ("ABS") for a DRAM in this description is being used for the convenience of describing the solution and does not suggest that embodiments of the solution are limited in application to a DRAM device having a particular MAL requirement. As such, one of ordinary skill in the art will recognize that the particular data transfer sizes, chunk sizes, bus widths, MALs, etc. that are referred to in this description are offered for exemplary purposes only and do not limit the scope of the envisioned solutions as being applicable to applications having the same data transfer sizes, chunk sizes, bus widths, MALs, etc.

Returning to the FIG. 1B illustration, a portion of an uncompressed image frame (aka, a "buffer") is depicted as being comprised of thirty uncompressed tiles or units, each of a size "K" as represented by a lack of shading. An exemplary size K may be 256 bytes, however, as explained above, a tile is not limited to any certain size and may vary according to application. For ease of illustration and description, the thirty tile portion of the larger uncompressed image frame is depicted as representative of the entire image frame. As would be understood by one of ordinary skill in the art, the uncompressed image frame may be reduced in size, thereby optimizing its transfer over a bus, reducing overall system power consumption and minimizing its impact on memory capacity, by a compressor block (depicted in FIG. 1B as Image CODEC Module 113A) that applies a compression algorithm on a tile by tile basis. The result of the compression is a compressed image frame plus a metadata file, as can be seen in the FIG. 1 illustration relative to the illustrated portion of the frame. The compressed image frame is comprised of the tiles in the original, uncompressed image frame after having been subjected to a compression algorithm by the compression block 113A.

In the uncompressed image frame, each tile may be of a size K, whereas in the compressed image frame each tile may be of a size K or less (K for no compression possible, K-1 bytes, K-2 bytes, K-3 bytes, . . . , K=1 byte). In the illustration, the various tiles that form the compressed image frame are represented by differing levels of shading depending on the extent of compression that resulted from the compression block 113A having applied its compression algorithm to the data held by the given tile. Notably, the compression block 113A creates a companion buffer for a compressed image frame metadata, as would be understood by one of ordinary skill in the art. The compressed image frame metadata contains a record of the size, type and attributes for each compressed tile in the compressed image frame. Because DRAM access may be limited to units of the minimum access length MAL, the size of a given compressed tile may be represented in the metadata as the number of ABSs required to represent the compressed tile size (e.g., 1 MAL, 2 MAL, . . . n MAL). This size description in the metadata allows a future reader of the buffer to ask the memory for only the minimum required amount of data needed to decompress each tile back to the original size K.

Figure 2:
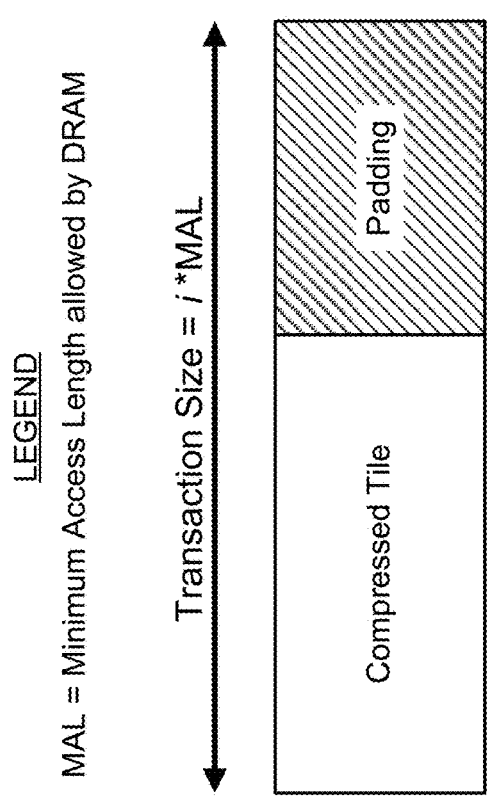
FIG. 2 illustrates a compressed data transaction with a DRAM memory component that has a required minimum access length ("MAL") per transaction.

FIG. 2 illustrates a compressed data transaction with a DRAM memory component that meets the requirement for each transaction to be an integer-multiple of the minimum access length ("MAL") per transaction. As can be understood from the FIG. 2 illustration, a compressed tile may be of a length that is less than an integer multiple of the minimum access length requirement for the DRAM in which it is stored. Consequently, a request for the compressed data requires a transaction that includes a certain amount of useless data, or "padding," needed to meet the integer-multiple of MAL requirement. The padding, which represents no useful information, is added to the compressed tile data to make the transaction size an integer multiple of the system MAL (i*MAL). An exemplary MAL may be 32 bytes or 64 bytes, depending on the particular chip technology (such as LPDDR2, LPDDR3, LPDDR4, etc.) and the memory bus width (×16, ×32, ×64). As an example, a compressed tile having a 63 byte size may be padded with 1 byte of padding data in order to make a complete 64 byte transaction size (2×32 B MAL or 1×64 B MAL). Similarly, a compressed tile having a 65 byte size may be padded with 31 bytes of the MAL is 32 Bytes (3×32 B MAL) or 63 bytes of padding data if MAL is 64 bytes in order to make a complete 128 byte transaction size (2×64 B MAL). Note that in the above examples, the difference in the compressed tile sizes is a mere 2 bytes; however, because the 65 byte compressed tile is over 64 bytes, a transaction of it must include significantly more padding.

Figure 3:
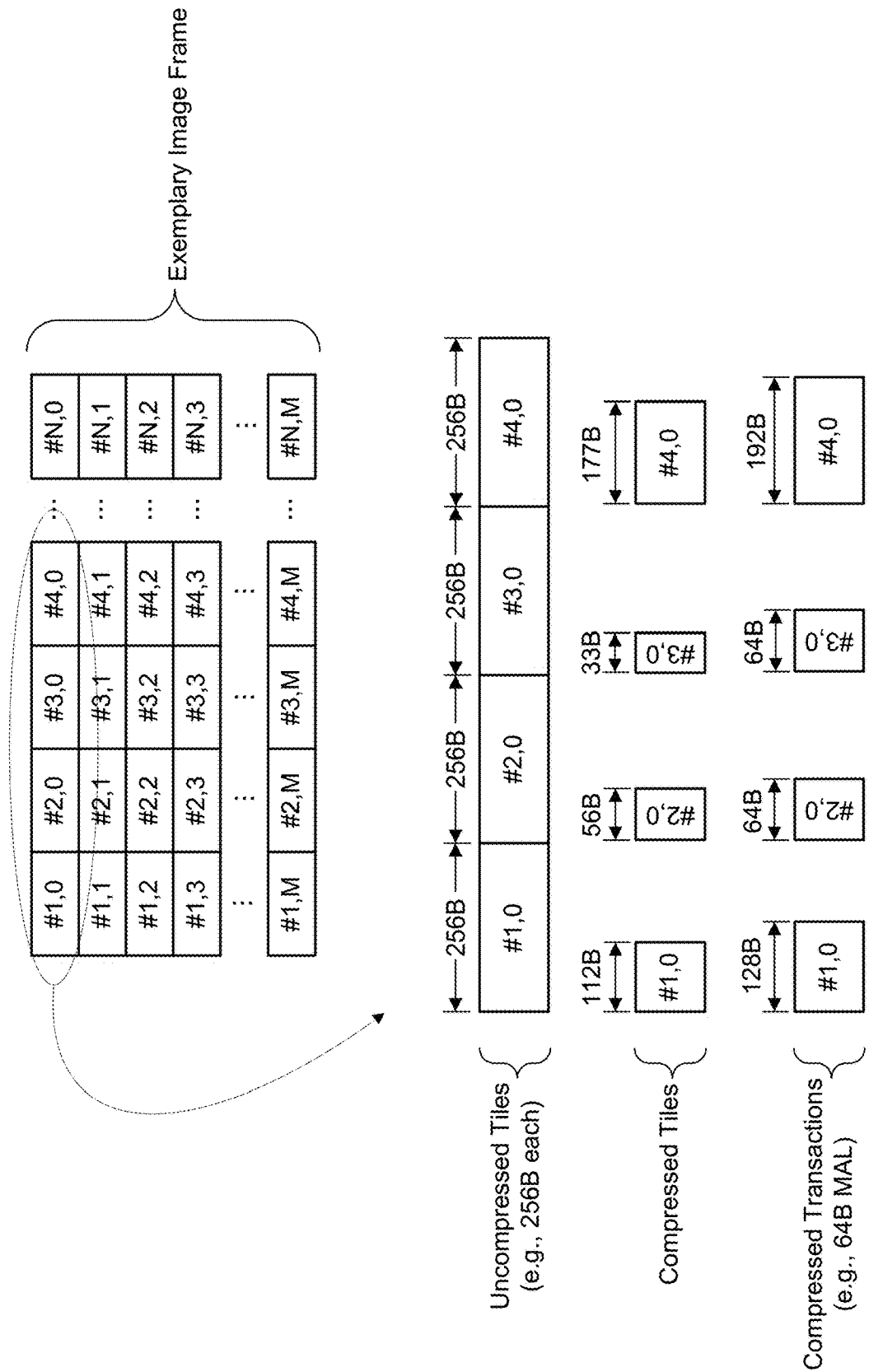
FIG. 3 illustrates a series of compressed data transactions associated with an exemplary image frame.

FIG. 3 illustrates a series of compressed data transactions associated with an exemplary image frame. Notably, the transactions or units in the FIG. 3 illustration may be considered as having been compressed according to either a lossless or a lossy compression algorithm (as well as those units depicted in the FIG. 1 and FIG. 2 illustrations).

The image frame is shown with "N" columns and "M" rows of tiles. The first four sequential tiles in the first row of tiles are illustrated in their uncompressed lengths, compressed lengths, and transaction lengths (compressed lengths plus padding) according to methods known in the art. The illustration is made within the context of the first four sequential tiles for convenience of illustration—the concepts depicted are relevant to groups of tiles other than the first four sequential tiles in a first row of tiles of an image frame, as would be understood by one of ordinary skill in the art.

Looking to the exemplary four sequential tiles in their uncompressed states, each tile (#1,0; #2,0; #3,0; #4,0) is of a 256 byte length (other lengths are envisioned). When compressed, the exemplary four sequential tiles have lengths of 112 bytes, 56 bytes, 33 bytes and 177 bytes, respectively. Assuming the MAL is 64 bytes, the transaction lengths for each of the exemplary four sequential tiles, respectively, may be 128 bytes (112 bytes compressed data plus 16 bytes padding), 64 bytes (56 bytes compressed data plus 8 bytes padding), 64 bytes (33 bytes compressed data plus 31 bytes padding) and 192 bytes (177 bytes compressed data plus 15 bytes padding). Notably, to transact all four of the exemplary sequential tiles, methods known in the art make four transactions—one for each compressed tile.

Turning now to the remaining figures, embodiments of the solution are described. As will become evident from the following figures and the related description, image frames may be sub-divided into sectors, each sector defined by a grouping of one or more adjacent tiles. A fixation point location may be determined to be within a given sector. From there, advantageously, the sector containing the fixation point may be compressed using a lossless compression algorithm (or a near-lossless lossy compression algorithm having a relatively low compression factor) while the remaining sectors within the frame are compressed according to increasingly lossy compression algorithms. Moreover, in some embodiments, a blind spot location may be determined to be within a second given sector that is, consequently, either compressed using a very high compression lossy compression algorithm, discarded altogether, or replaced with filler data, since the quality of a decompressed data associated with a blind spot has no impact on QoS. In this way, instead of a single compression algorithm applied across all tiles in image frame, embodiments of the solution provide for a mixed compression approach within an image frame.

Figure 4:
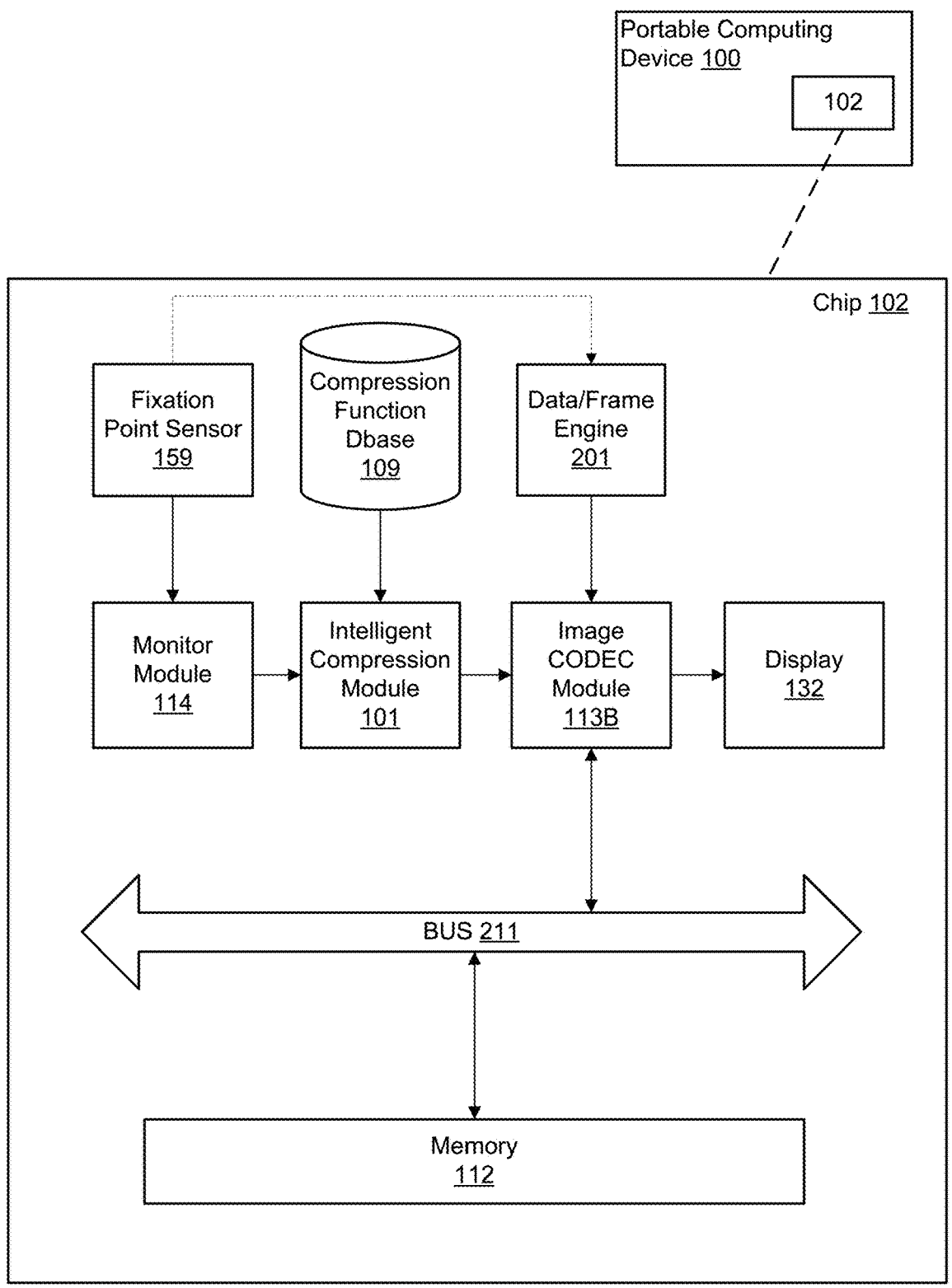
FIG. 4 is a functional block diagram illustrating an embodiment of an on-chip system for intelligent compression using a foveated-compression methodology.

FIG. 4 is a functional block diagram illustrating an embodiment of an on-chip system 102 for intelligent compression ("IC") using a foveated-compression methodology. As can be understood from the FIG. 4 illustration, a monitor module 114 is in communication with a fixation point sensor 159. The fixation sensor 159 may be configured to determine an area of user focus within a given image frame generated by data/frame engine 201. The fixation point location may be provided by the monitor module 114 to the intelligent compression ("IC") module 101. The intelligent compression module 101, in communication with compression function database 109, may generate a compression map that divides the image frame into a series of sectors. The intelligent compression module 101, in communication with the compression function database 109, may also generate a compression map that adjusts the size of a foveated region in a data frame based on knowledge of a latency factor associated with the fixation point sensor 159 and/or monitor module 114. It is envisioned that the foveated region, depending on the latency factor, may be defined by a single sector or multiple adjacent sectors.

The intelligent compression module 101 may also generate as part of its compression map instructions for compressing tiles within the one or more sectors. The compression map may be provided to the image codec module 113B from the intelligent compression module 101 which, in turn, compresses the image frame received from the data/frame engine 201 according to the compression map. In this way, the image codec module 113B may compress tiles within each defined sector according to an optimum compression algorithm such as, for example, using a lossless compression algorithm for tiles within the given sector that corresponds to the fixation point determined from the fixation point sensor 159 while using lossy compression algorithms for sectors that do not correspond to the fixation point location.

The image codec module 113B may transmit the compressed image frame, compressed according to a foveated-compression methodology as described above and below, via the bus 211 to memory 112 (which may contain a DDR memory component) for storage. Subsequently, the compressed image frame may be returned to image codec module 113B for decompression according to the compression map originally generated by the intelligent compression module 101 before being rendered to the user via display 132. In the process of decompression, the image codec module 113B may communicate with the intelligent compression module 101, or directly with the compression function database 109, to identify the compression map used for compression of the image frame.

Advantageously, by using a foveated-compression methodology, embodiments of the solution may optimally compress image frames such that only those sectors of the image frame having the most impact on QoS are compressed using a low compression, lossless compression algorithm while those sectors having little or no impact on QoS are aggressively compressed using lossy compression algorithms. Moreover, in some embodiments, a sector determined to contain a blind spot (the location of which may be determined by the IC module 101 based on the known location of a fixation point) may be compressed according to the most aggressive lossy compression algorithm available to the particular embodiment of the solution. As will become more apparent from the following illustrations, it is envisioned that embodiments of the solution may apply lossy compression algorithms having increasingly high compression factors (and thus, increasingly low quality decompressed outputs) as the sectors increase in distance from a given sector associated with the fixation point. Image codec module 113B may be split into an encoder module, for writing frame into memory, and a decoder module, for reading compressed frame from memory. These two modules may be collocated or may be physically separate and located within other blocks inside the chip.

Figure 5:
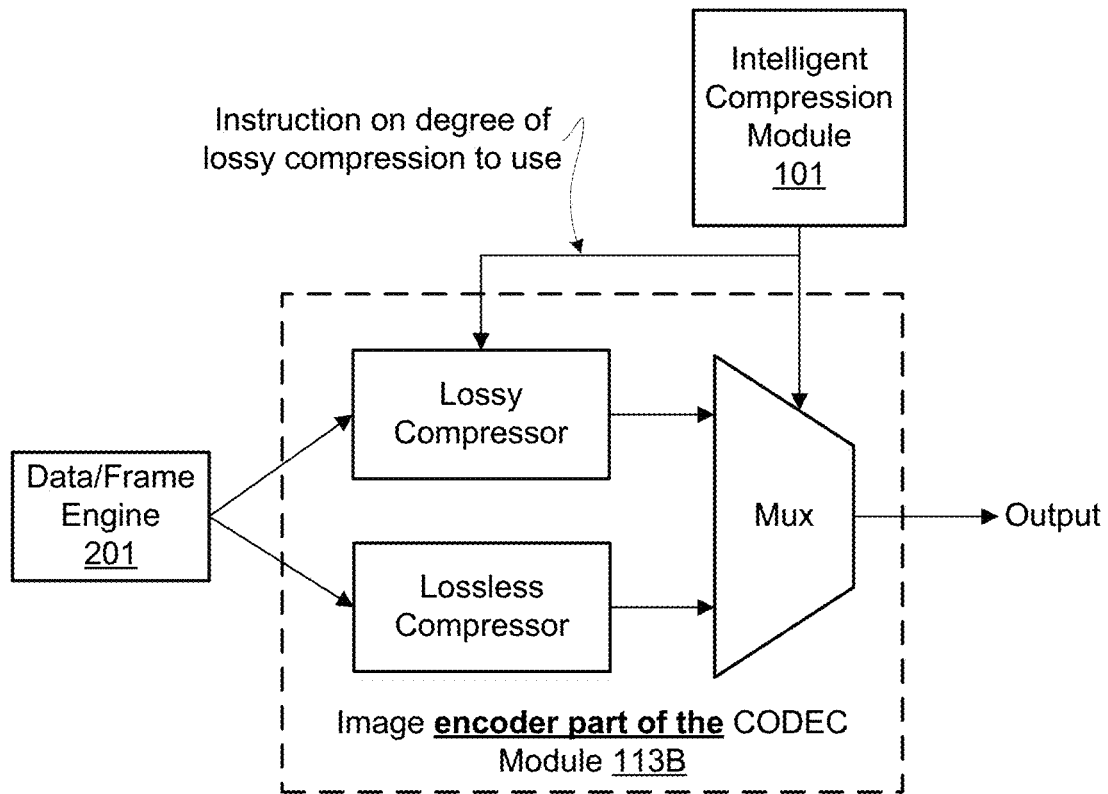
FIG. 5 is a functional block diagram illustrating an embodiment of the image CODEC module of FIG. 4 configured for implementation of an intelligent compression approach that utilizes a foveated-compression methodology including lossless and lossy algorithms.

FIG. 5 is a functional block diagram illustrating an embodiment of the encoder portion of the image CODEC module 113B of FIG. 4 configured for implementation of an intelligent compression approach that utilizes a foveated-compression methodology including lossless and lossy algorithms. As illustrated and described relative to FIG. 4, the producer engine 201 may provide its uncompressed frame input to the image CODEC 113B which, in turn, may compress the frame on a sector by sector approach according to a compression map generated by the intelligent compression module 101. Depending on the sector, the image codec module 113B may utilize either a lossless compressor block or a lossy compression block. The determination as to which compressor block may be used to compress tiles within a given sector, as well as the compression factor of the algorithm applied by the compressor block, is dependent upon instructions received from the intelligent compression module 101. The intelligent compression module 101 may generate the instructions in view of a compression map or compression function queried from the compression function database 109.

Figure 6:
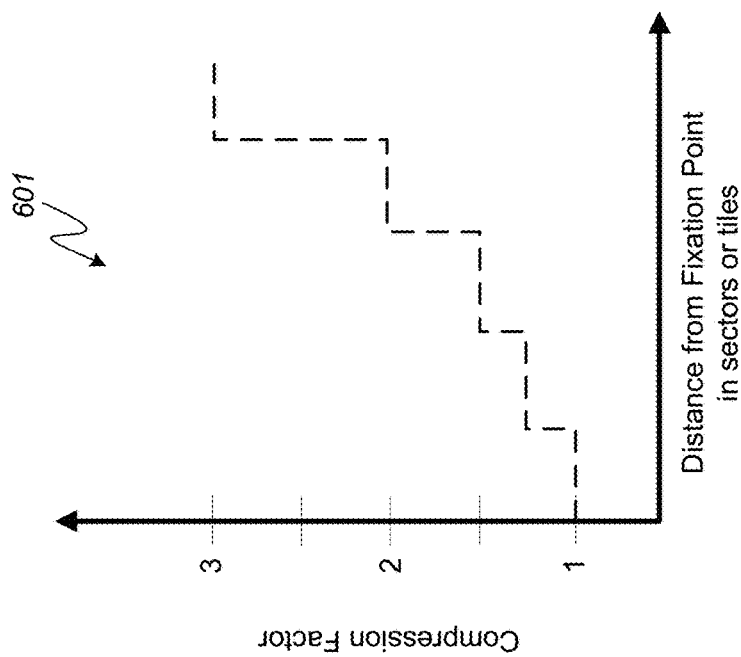
FIG. 6 illustrates an exemplary graph output of a mathematical equation and an exemplary lookup table, each specifying compression ratio as a function of distance for a given sector from a fixation point.

FIG. 6 illustrates an exemplary graph output 601 of a mathematical equation and an exemplary lookup table 602, each specifying compression ratio as a function of distance for a given sector from a fixation point. The exemplary mathematical equation that would generate graph output 601 and exemplary lookup table 602 may be stored in compression function database 109. As can be understood from the FIG. 6 illustration, an intelligent compression methodology may dictate that compression algorithms with increasing relative compression factors may be used on sectors within an image frame dependent upon the position/distance of a given sector relative to a sector associated with a fixation point. Simply stated, the farther away a given sector is from the sector that is associated with a fixation point, the higher the compression factor of the compression algorithm used by an embodiment of the solution to compress the given sector.

Figure 7:
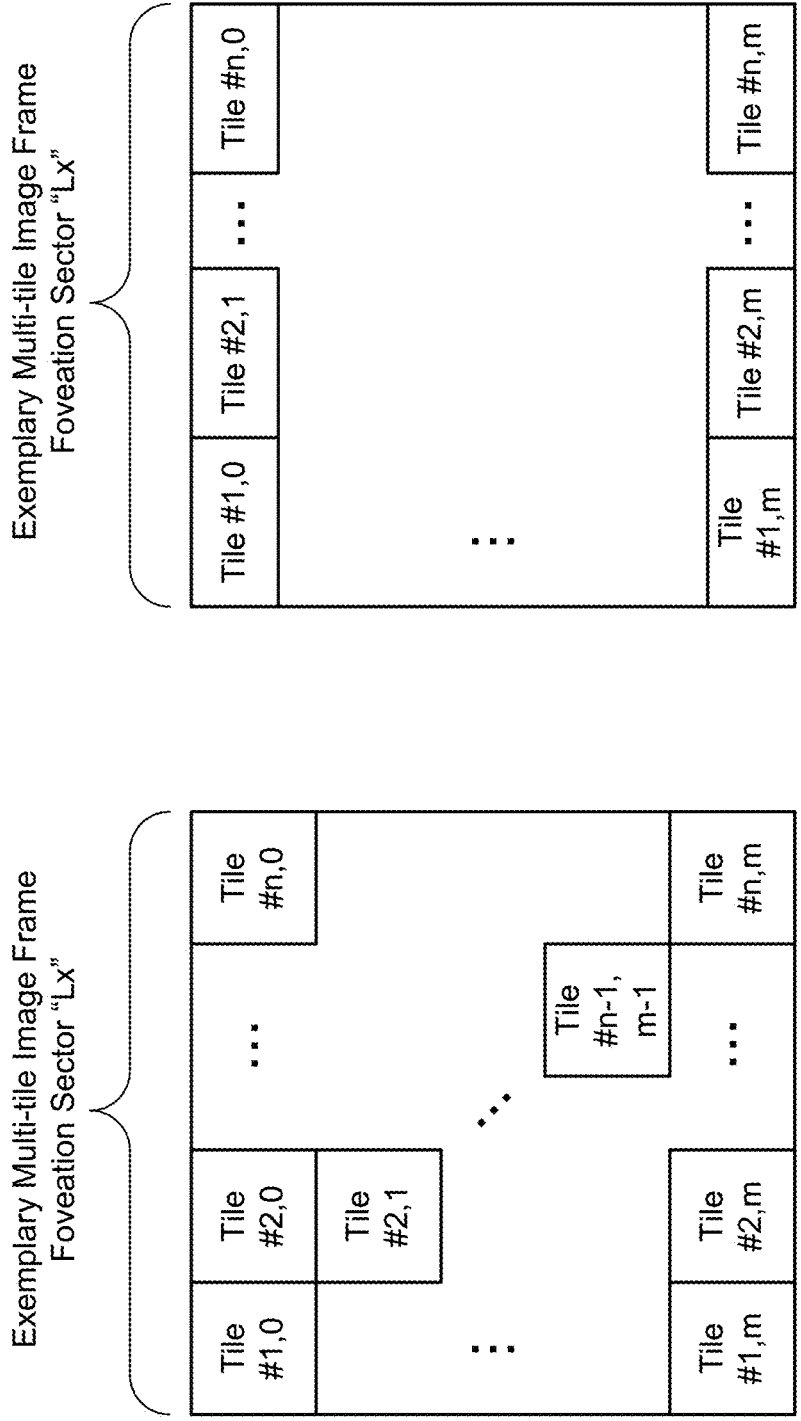
FIG. 7 illustrates exemplary foveation sectors defined within an image frame, each foveation sector including one or more tiles of the image frame.

FIG. 7 illustrates exemplary foveation sectors defined within an image frame, each foveation sector including one or more tiles of the image frame. As can be understood from the FIG. 7 illustration, a foveation sector "Lx" may be defined to encompass any number of tiles arranged within the sector according to "n" columns and "m" rows. As can also be understood from the FIG. 7 illustration, a given foveation sector "Lx" may include tiles having any suitable aspect ratio and, as such, it is envisioned that tiles may be either square or rectangular in nature.

FIG. 8 illustrates an exemplary image frame 800 sectored and compressed according to an embodiment of the solution utilizing an exemplary square-grid foveated-compression pattern. A square-grid foveated-compression pattern may also be described and categorized as a side-and-corner adjacency foveated-compression pattern, as can be understood from a review of the FIG. 8 illustration. It will be understood that although the exemplary image frame 800 is shown as divided into a certain number of sectors, embodiments of the solution are not limited by any specific number or shape of sectors. Moreover, although the sectors depicted in the FIG. 8 illustration are square, it is envisioned that sectors, like tiles, may be defined by any aspect ratio without departing from the scope of the solution.

A compression map generated by the intelligent compression module 101, or queried from the compression function database 109, may define the size, number, pattern and relative locations of the sectors. In the present illustration, the pattern of sectors is a square-grid foveated-compression pattern. Further, the compression map may also dictate the particular compression algorithm (and, by extension, the compression factor) applied to each particular sector and in what manner.

As can be seen in the FIG. 8 illustration, a fixation point represented by a "star" is located within a given sector, hereinafter referred to as the fixation sector. The fixation point location may have been determined by the monitor module 114 working with the fixation point sensor 159. In turn, the given sector determined to be the fixation sector is that sector within the image frame that contains the fixation point.

As described above, each sector "Lx" may encompass one or more whole tiles. The tiles in the fixation sector, labeled "L1" in the FIG. 8 illustration, may be compressed according to either a lossless compression algorithm or a very high quality lossy compression algorithm having a relatively low compression factor. According to the exemplary square-grid foveated-compression pattern depicted, each sector juxtaposed to a side or corner of the fixation sector is designated as an "L2" sector and, as such, each tile within an "L2" sector is compressed according to a compression algorithm having a compression factor that is either the same as, or higher than, the compression factor associated with the algorithm used to compress the fixation sector.

Similarly, each sector juxtaposed to a side or corner of an "L2" sector is designated as an "L3" sector and, as such, each tile within an "L3" sector is compressed according to a compression algorithm having a compression factor that is either the same as, or higher than, the compression factor associated with the algorithm used to compress an L2 sector. Further, each sector juxtaposed to a side or corner of an "L3" sector is designated as an "L4" sector and, as such, each tile within an "L4" sector is compressed according to a compression algorithm having a compression factor that is either the same as, or higher than, the compression factor associated with the algorithm used to compress an L3 sector. The pattern continues accordingly, and as can be understood from the FIG. 8 illustration, such that a foveated-compression methodology is achieved that optimizes compression resources with minimal impact on QoS.

FIG. 9 illustrates an exemplary image frame 900 sectored and compressed according to an embodiment of the solution utilizing an exemplary gradated square-grid foveated-compression pattern. The exemplary image frame 900 has been sectored consistent with that which was described above relative to the FIG. 8 illustration. The compression map for the exemplary image frame 900, however, differs from the compression map associated with the FIG. 8 illustration in that it further includes instructions for gradating the compression pattern within sectors.

By gradating the compression pattern within sectors, it is envisioned that embodiments of the solution that utilize a compression map with gradation instructions may generate gradual, fine-grained drop-offs in output quality as a function of distance from the fixation sector. To do so, tiles within a given sector may be compressed according to different compression algorithms and/or algorithms associated with different compression factors. Generally, as the distance from the fixation sector increases, tiles will be subjected to compression with increased compression factors, as is indicated by the arrows seen in the sectors of the image frame 900. While every tile in a given sector of the image frame 800 might be compressed according to a single compression algorithm having a single compression factor, different tiles within a given sector of the image frame 900 might be compressed subject to different compression factors. Notably, although the tiles within a given sector of the image frame 900 might be compressed subject to different compression factors when the image frame is subjected to a gradated square-grid foveated-compression pattern, it is envisioned that the average compression factor for all tiles within a given sector may fall within a range identified by the overall compression category, Lx, for that given sector.

For example, referring back to the FIG. 7 illustration, consider a sector in the FIG. 9 illustration depicted with an arrow leading from left to right—the tiles in column #1 may all be subjected to a lossy compression algorithm having a least aggressive compression factor relative to the tiles in column #n which may all be subjected to a lossy compression algorithm having a most aggressive compression factor relative to algorithms applied to other tiles in the sector.

As another example in view of the FIG. 7 illustration, consider a sector in the FIG. 9 illustration depicted with an arrow leading angularly upward from the lower left corner of the sector to the upper right corner—the tile at position "1,m" may be subjected to a lossy compression algorithm having a least aggressive compression factor relative to the tile at position "n,0" which may be subjected to a lossy compression algorithm having a most aggressive compression factor relative to algorithms applied to other tiles in the sector. Moreover, the tiles juxtaposed corner-to-corner in a diagonal line from tile "1,0" to tile "n,m" may be subjected to a lossy compression algorithm having an average compression factor relative to algorithms applied to other tiles in the sector.

FIG. 10 illustrates an exemplary image frame 1000 sectored and compressed according to an embodiment of the solution utilizing an exemplary cross-grid foveated-compression pattern. It will be understood that although the exemplary image frame 1000 is shown as divided into a certain number of sectors, embodiments of the solution are not limited by any specific number or shape of sectors. Moreover, although the sectors depicted in the FIG. 10 illustration are square, it is envisioned that sectors, like tiles, may be defined by any aspect ratio without departing from the scope of the solution.

A compression map generated by the intelligent compression module 101, or queried from the compression function database 109, may define the size, number, pattern and relative locations of the sectors. In the present illustration, the pattern of sectors is a cross-grid foveated-compression pattern. Further, the compression map may also dictate the particular compression algorithm (and, by extension, the compression factor) applied to each particular sector and in what manner.

As can be seen in the FIG. 10 illustration, a fixation point represented by a "star" is located within a given sector, hereinafter referred to as the fixation sector. The fixation point location may have been determined by the monitor module 114 working with the fixation point sensor 159. In turn, the given sector determined to be the fixation sector is that sector within the image frame that contains the fixation point.

As described above, each sector "Lx" may encompass one or more whole tiles. The tiles in the fixation sector, labeled "L1" in the FIG. 10 illustration, may be compressed according to either a lossless compression algorithm or a very high quality lossy compression algorithm having a relatively low compression factor. According to the exemplary cross-grid foveated-compression pattern depicted, each sector juxtaposed to a side of (but not a corner of) the fixation sector is designated as an "L2" sector and, as such, each tile within an "L2" sector is compressed according to a compression algorithm having a compression factor that is either the same as, or higher than, the compression factor associated with the algorithm used to compress the fixation sector.

Similarly, each sector juxtaposed to a side of (but not a corner of) an "L2" sector is designated as an "L3" sector and, as such, each tile within an "L3" sector is compressed according to a compression algorithm having a compression factor that is either the same as, or higher than, the compression factor associated with the algorithm used to compress an L2 sector. Further, each sector juxtaposed to a side of (but not a corner of) an "L3" sector is designated as an "L4" sector and, as such, each tile within an "L4" sector is compressed according to a compression algorithm having a compression factor that is either the same as, or higher than, the compression factor associated with the algorithm used to compress an L3 sector. The pattern continues accordingly, and as can be understood from the FIG. 10 illustration, such that a foveated-compression methodology is achieved that optimizes compression resources with minimal impact on QoS.

FIG. 11 illustrates an exemplary image frame 1100 sectored and compressed according to an embodiment of the solution utilizing an exemplary gradated cross-grid foveated-compression pattern. The exemplary image frame 1100 has been sectored consistent with that which was described above relative to the FIG. 10 illustration. The compression map for the exemplary image frame 1100, however, differs from the compression map associated with the FIG. 10 illustration in that it further includes instructions for gradating the compression pattern within sectors.

By gradating the compression pattern within sectors, it is envisioned that embodiments of the solution that utilize a compression map with gradation instructions may generate gradual, fine-grained drop-offs in output quality as a function of distance from the fixation sector. To do so, tiles within a given sector may be compressed according to different compression algorithms and/or algorithms associated with different compression factors. Generally, as the distance from the fixation sector increases, tiles will be subjected to compression with increased compression factors, as is indicated by the arrows seen in the sectors of the image frame 1100. While every tile in a given sector of the image frame 1000 might be compressed according to a single compression algorithm having a single compression factor, different tiles within a given sector of the image frame 1100 might be compressed subject to different compression factors. Notably, although the tiles within a given sector of the image frame 1100 might be compressed subject to different compression factors when the image frame is subjected to a gradated cross-grid foveated-compression pattern, it is envisioned that the average compression factor for all tiles within a given sector may fall within a range identified by the overall compression category, Lx, for that given sector.

For example, referring back to the FIG. 7 illustration, consider a sector in the FIG. 11 illustration depicted with an arrow leading from left to right—the tiles in column #1 may all be subjected to a lossy compression algorithm having a least aggressive compression factor relative to the tiles in column #n which may all be subjected to a lossy compression algorithm having a most aggressive compression factor relative to algorithms applied to other tiles in the sector.

As another example in view of the FIG. 7 illustration, consider a sector in the FIG. 11 illustration depicted with an arrow leading angularly upward from the lower left corner of the sector to the upper right corner—the tile at position "1,m" may be subjected to a lossy compression algorithm having a least aggressive compression factor relative to the tile at position "n,0" which may be subjected to a lossy compression algorithm having a most aggressive compression factor relative to algorithms applied to other tiles in the sector. Moreover, the tiles juxtaposed corner-to-corner in a diagonal line from tile "1,0" to tile "n,m" may be subjected to a lossy compression algorithm having an average compression factor relative to algorithms applied to other tiles in the sector.

Figure 12:
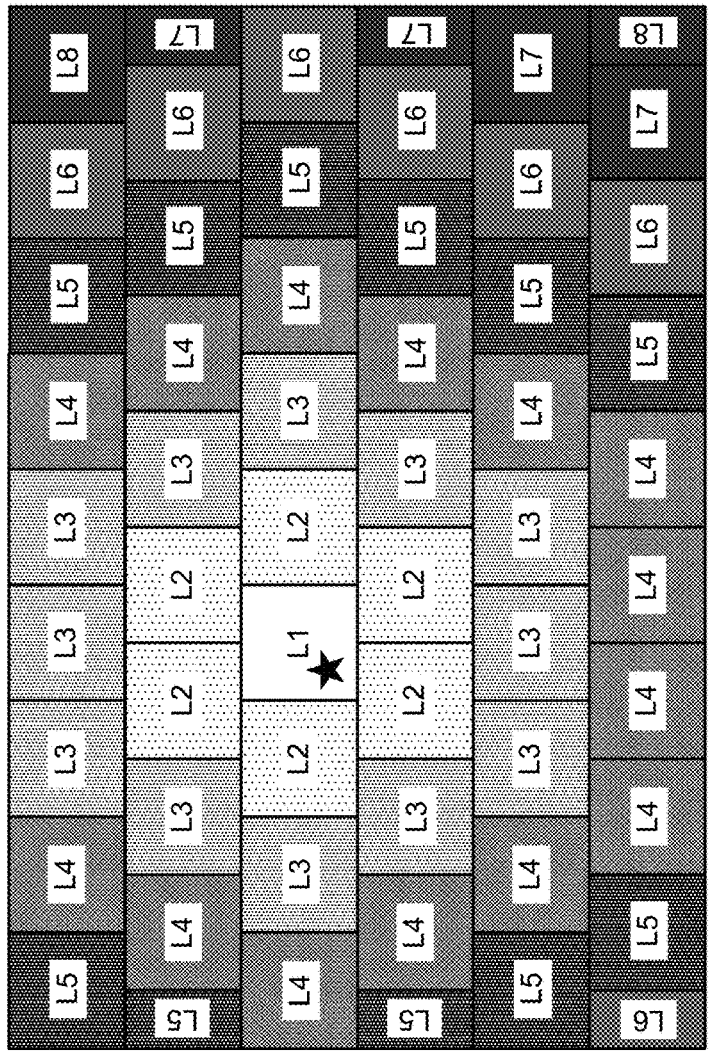
FIG. 12 illustrates an exemplary image frame sectored and compressed according to an embodiment of the solution utilizing an exemplary honeycomb foveated-compression pattern.

FIG. 12 illustrates an exemplary image frame 1200 sectored and compressed according to an embodiment of the solution utilizing an exemplary honeycomb foveated-compression pattern. It will be understood that although the exemplary image frame 1200 is shown as divided into a certain number of sectors, embodiments of the solution are not limited by any specific number or shape of sectors. Moreover, although the sectors depicted in the FIG. 12 illustration are square, it is envisioned that sectors, like tiles, may be defined by any aspect ratio without departing from the scope of the solution.

A compression map generated by the intelligent compression module 101, or queried from the compression function database 109, may define the size, number, pattern and relative locations of the sectors. In the present illustration, the pattern of sectors is a honeycomb foveated-compression pattern. Further, the compression map may also dictate the particular compression algorithm (and, by extension, the compression factor) applied to each particular sector and in what manner.

As can be seen in the FIG. 12 illustration, a fixation point represented by a "star" is located within a given sector, hereinafter referred to as the fixation sector. The fixation point location may have been determined by the monitor module 114 working with the fixation point sensor 159. In turn, the given sector determined to be the fixation sector is that sector within the image frame that contains the fixation point.

As described above, each sector "Lx" may encompass one or more whole tiles. The tiles in the fixation sector, labeled "L1" in the FIG. 12 illustration, may be compressed according to either a lossless compression algorithm or a very high quality lossy compression algorithm having a relatively low compression factor. According to the exemplary honeycomb foveated-compression pattern depicted, each horizontal line of sectors is offset relative to its adjacent line(s) of sectors such that no corner of a sector corresponds with a corner of an adjacent sector. Any sector juxtaposed to the fixation sector is designated as an "L2" sector and, as such, each tile within an "L2" sector is compressed according to a compression algorithm having a compression factor that is either the same as, or higher than, the compression factor associated with the algorithm used to compress the fixation sector.

Similarly, each sector juxtaposed to an "L2" sector is designated as an "L3" sector and, as such, each tile within an "L3" sector is compressed according to a compression algorithm having a compression factor that is either the same as, or higher than, the compression factor associated with the algorithm used to compress an L2 sector. Further, each sector juxtaposed to an "L3" sector is designated as an "L4" sector and, as such, each tile within an "L4" sector is compressed according to a compression algorithm having a compression factor that is either the same as, or higher than, the compression factor associated with the algorithm used to compress an L3 sector. The pattern continues accordingly, and as can be understood from the FIG. 12 illustration, such that a foveated-compression methodology is achieved that optimizes compression resources with minimal impact on QoS.

FIG. 13 illustrates an exemplary image frame 1300 sectored and compressed according to an embodiment of the solution utilizing an exemplary gradated honeycomb foveated-compression pattern. The exemplary image frame 1300 has been sectored consistent with that which was described above relative to the FIG. 12 illustration. The compression map for the exemplary image frame 1300, however, differs from the compression map associated with the FIG. 12 illustration in that it further includes instructions for gradating the compression pattern within sectors.

By gradating the compression pattern within sectors, it is envisioned that embodiments of the solution that utilize a compression map with gradation instructions may generate gradual, fine-grained drop-offs in output quality as a function of distance from the fixation sector. To do so, tiles within a given sector may be compressed according to different compression algorithms and/or algorithms associated with different compression factors. Generally, as the distance from the fixation sector increases, tiles will be subjected to compression with increased compression factors, as is indicated by the arrows seen in the sectors of the image frame 1300. While every tile in a given sector of the image frame 1200 might be compressed according to a single compression algorithm having a single compression factor, different tiles within a given sector of the image frame 1300 might be compressed subject to different compression factors. Notably, although the tiles within a given sector of the image frame 1300 might be compressed subject to different compression factors when the image frame is subjected to a gradated honeycomb foveated-compression pattern, it is envisioned that the average compression factor for all tiles within a given sector may fall within a range identified by the overall compression category, Lx, for that given sector.

For example, referring back to the FIG. 7 illustration, consider a sector in the FIG. 13 illustration depicted with an arrow leading from left to right—the tiles in column #1 may all be subjected to a lossy compression algorithm having a least aggressive compression factor relative to the tiles in column #n which may all be subjected to a lossy compression algorithm having a most aggressive compression factor relative to algorithms applied to other tiles in the sector.

Figure 14:
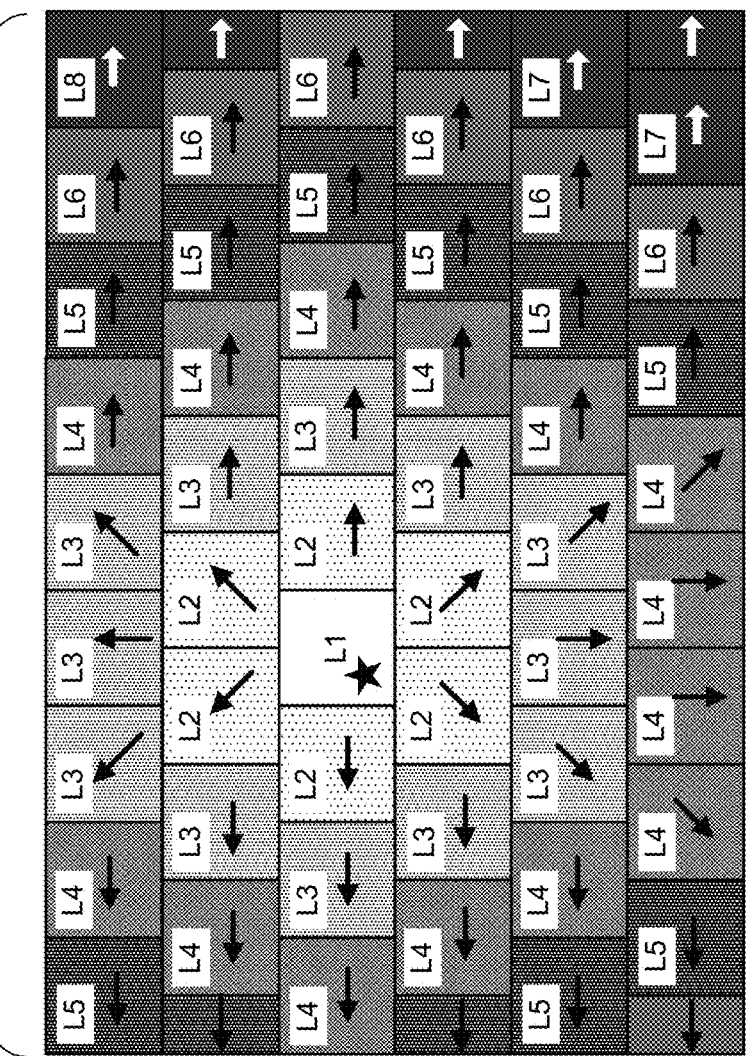
FIG. 14 illustrates an exemplary image frame sectored and compressed according to an embodiment of the solution utilizing an exemplary gradated honeycomb foveated-compression pattern.

FIG. 14 illustrates an exemplary image frame 1400 sectored and compressed according to an embodiment of the solution utilizing an exemplary gradated honeycomb foveated-compression pattern. The exemplary image frame 1400 has been sectored consistent with that which was described above relative to the FIG. 12 illustration. The compression map for the exemplary image frame 1400, however, differs from the compression map associated with the FIG. 12 illustration in that it further includes instructions for gradating the compression pattern within sectors. The compression map for the exemplary image frame 1400 also differs from the compression map associated with the FIG. 13 illustration in that it includes different instructions for gradating the compression pattern within sectors. The FIG. 14 illustration is offered to show that different patterns of gradation are envisioned and that, consequently, embodiments of the solution are not limited to any particular pattern or approach to compression gradation within sectors.

By gradating the compression pattern within sectors, it is envisioned that embodiments of the solution that utilize a compression map with gradation instructions may generate gradual, fine-grained drop-offs in output quality as a function of distance from the fixation sector. To do so, tiles within a given sector may be compressed according to different compression algorithms and/or algorithms associated with different compression factors. Generally, as the distance from the fixation sector increases, tiles will be subjected to compression with increased compression factors, as is indicated by the arrows seen in the sectors of the image frame 1400. While every tile in a given sector of the image frame 1200 might be compressed according to a single compression algorithm having a single compression factor, different tiles within a given sector of the image frame 1400 might be compressed subject to different compression factors. Notably, although the tiles within a given sector of the image frame 1400 might be compressed subject to different compression factors when the image frame is subjected to a gradated honeycomb foveated-compression pattern, it is envisioned that the average compression factor for all tiles within a given sector may fall within a range identified by the overall compression category, Lx, for that given sector.

For example, referring back to the FIG. 7 illustration, consider a sector in the FIG. 14 illustration depicted with an arrow leading from left to right—the tiles in column #1 may all be subjected to a lossy compression algorithm having a least aggressive compression factor relative to the tiles in column #n which may all be subjected to a lossy compression algorithm having a most aggressive compression factor relative to algorithms applied to other tiles in the sector.

As another example in view of the FIG. 7 illustration, consider a sector in the FIG. 14 illustration depicted with an arrow leading angularly upward from the lower left corner of the sector to the upper right corner—the tile at position "1,m" may be subjected to a lossy compression algorithm having a least aggressive compression factor relative to the tile at position "n,0" which may be subjected to a lossy compression algorithm having a most aggressive compression factor relative to algorithms applied to other tiles in the sector. Moreover, the tiles juxtaposed corner-to-corner in a diagonal line from tile "1,0" to tile "n,m" may be subjected to a lossy compression algorithm having an average compression factor relative to algorithms applied to other tiles in the sector.

Figure 15:
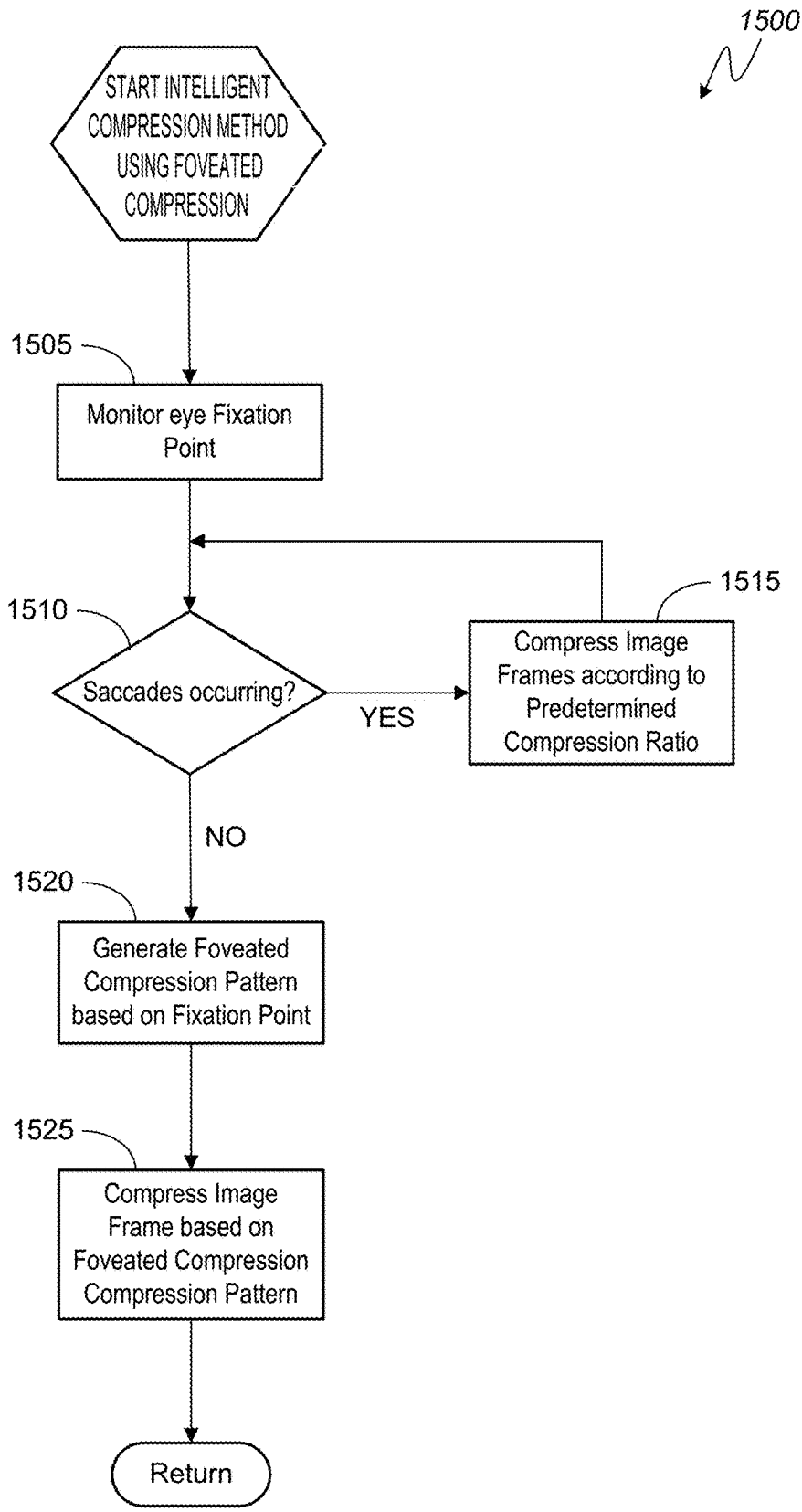
FIG. 15 is a logical flowchart illustrating an intelligent compression method according to the solution that utilizes a foveated-compression approach including lossless and lossy algorithms.

FIG. 15 is a logical flowchart illustrating an intelligent compression method 1500 according to the solution that utilizes a foveated-compression approach including lossless and lossy algorithms. Beginning at block 1505, a user's point of focus is monitored. As would be understood by one of ordinary skill in the art of visual focus, a user's point of focus on an image, or fixation point, is perceived at a highest level of acuity. Moreover, and as can be understood from FIG. 1A along with the definition of fixation point, acuity reduces as a function of distance (or angle) from the user's fovea (i.e., a user's acuity is reduced in peripheral field of vision). Advantageously, by leveraging knowledge of a user's fixation point on an image, data associated with sectors of the image that are a distance away from the fixation point may be compressed using lossy compression algorithms as relatively lower output quality upon decompression may not significantly impact QoS.

Returning to the method 1500, at decision block 1510 it may be determined from the monitoring of the fixation point whether saccades is occurring, i.e. whether the user is rapidly translating from one fixation point to another fixation point. If saccades is occurring, then the "yes" branch is followed to block 1515 and the image may be compressed according to a predetermined compression ratio. If, however, monitoring the fixation point determines that the user is focused on a particular area of the image, as opposed to transitioning between two fixation points within the image, then the "no" branch is followed to block 1520 and a foveated compression pattern is generated in view of the fixation point. Notably, it is envisioned that the foveated compression pattern generated at block 1520 may, or may not be, gradated within sectors, as described above relative to FIGS. 8-14. Moreover, it is envisioned that the foveated compression pattern generated at block 1520 may be, but is not limited to being, consistent with any one of the exemplary foveated compression patterns illustrated and described relative to FIGS. 8-14.

From block 1520, the method 1500 continues to block 1525. At block 1525 the image is compressed based on the generated foveated compression pattern. As described in more detail above, the image frame may be sectored and a fixation sector determined (i.e., the sector containing the fixation point). The fixation sector is compressed using a lossless compression algorithm or, in some cases, a lossy compression algorithm associated with a relatively low compression factor. In this way, later decompression of the image will produce a highest quality output at the sector of the image that is the most relevant for user experience and, by extension, QoS. As explained above, sectors other than the fixation sector may be compressed (and later decompressed) according to lossy compression algorithms associated with relatively higher and higher compression factors as a function of distance from the fixation sector, i.e. the sectors farthest away from the fixation sector may be subjected to a lossy compression algorithm having a relatively highest compression factor. The method 1500 returns.

Figure 16:
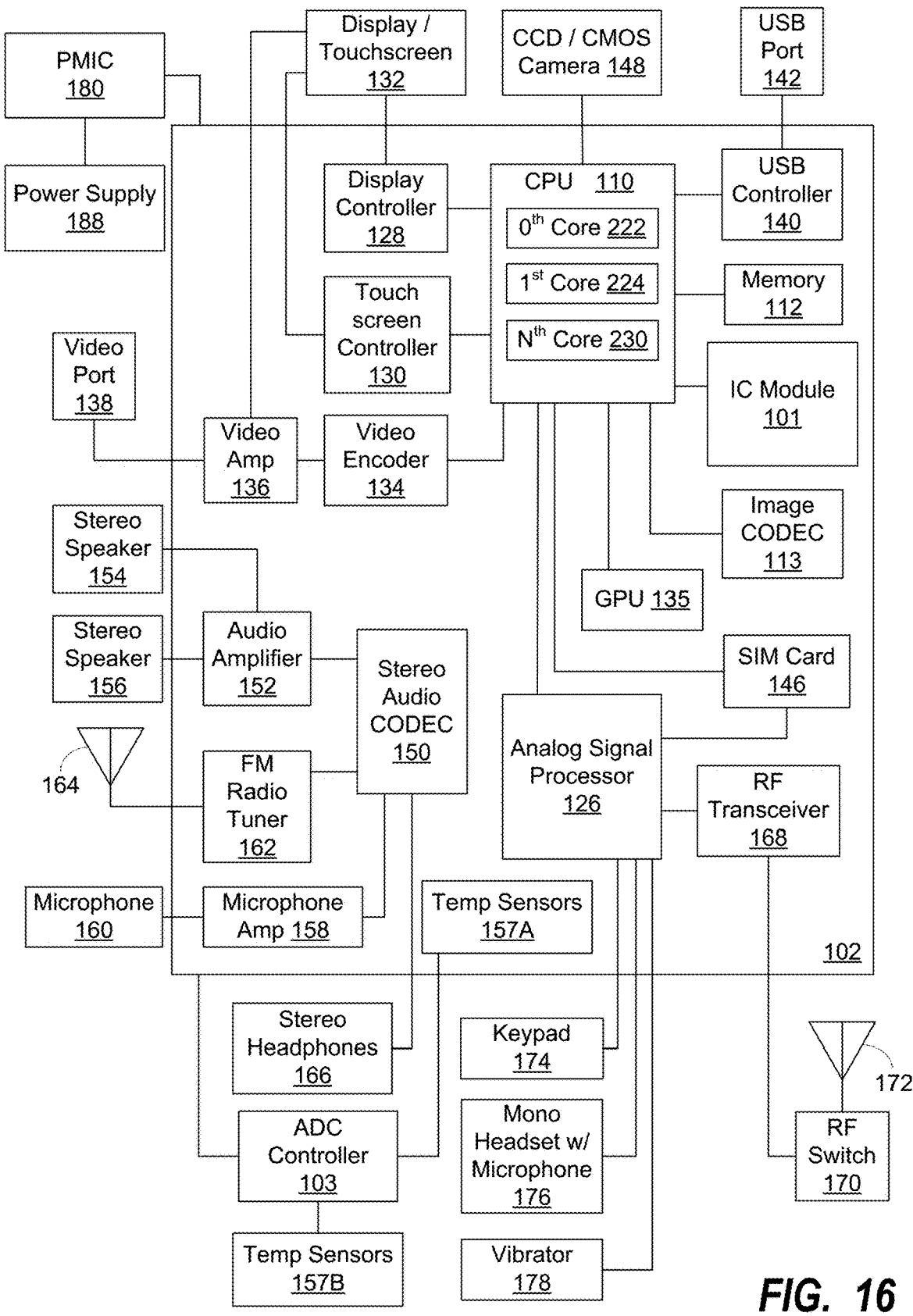
FIG. 16 is a functional block diagram illustrating an exemplary, non-limiting aspect of a portable computing device ("PCD") in the form of a wireless telephone for implementing intelligent compression methods and systems according to the solution.

FIG. 16 is a functional block diagram illustrating an exemplary, non-limiting aspect of a portable computing device ("PCD") 100 in the form of a wireless telephone for implementing intelligent compression methods and systems according to the solution. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill.

In general, intelligent compression ("IC") module 101 may be formed from hardware and/or firmware and may be responsible for generating a foveated compression map and causing an image CODEC module 113 to compress an image in a foveated manner using lossy and lossless compression algorithms. As illustrated in FIG. 16, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core CPU 110. A video amplifier 136 is coupled to the video encoder 134 and the touch screen display 132. A video port 138 is coupled to the video amplifier 136. As depicted in FIG. 16, a universal serial bus ("USB") controller 140 is coupled to the CPU 110. Also, a USB port 142 is coupled to the USB controller 140.

A memory 112, which may include a PoP memory, a cache, a mask ROM/Boot ROM, a boot OTP memory, a type DDR of DRAM memory, etc. may also be coupled to the CPU 110. A subscriber identity module ("SIM") card 146 may also be coupled to the CPU 110. Further, as shown in FIG. 16, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 16, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 16 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 16 further indicates that a radio frequency ("RF") transceiver 168 may be coupled to the analog signal processor 126. An RF switch 170 may be coupled to the RF transceiver 168 and an RF antenna 172. As shown in FIG. 16, a keypad 174 may be coupled to the analog signal processor 126. Also, a mono headset with a microphone 176 may be coupled to the analog signal processor 126. Further, a vibrator device 178 may be coupled to the analog signal processor 126. FIG. 16 also shows that a power supply 188, for example a battery, is coupled to the on-chip system 102 through a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller (not shown). However, other types of thermal sensors 157 may be employed.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, the PMIC 180 and the power supply 188 are external to the on-chip system 102. It will be understood, however, that one or more of these devices depicted as external to the on-chip system 102 in the exemplary embodiment of a PCD 100 in FIG. 16 may reside on chip 102 in other exemplary embodiments.

In a particular aspect, one or more of the method steps described herein may be implemented by executable instructions and parameters stored in the memory 112 or as form the IC module 101 and/or the image CODEC module 113. Further, the IC module 101, the image CODEC module 113, the memory 112, the instructions stored therein, or a combination thereof may serve as a means for performing one or more of the method steps described herein.

Figure 17:
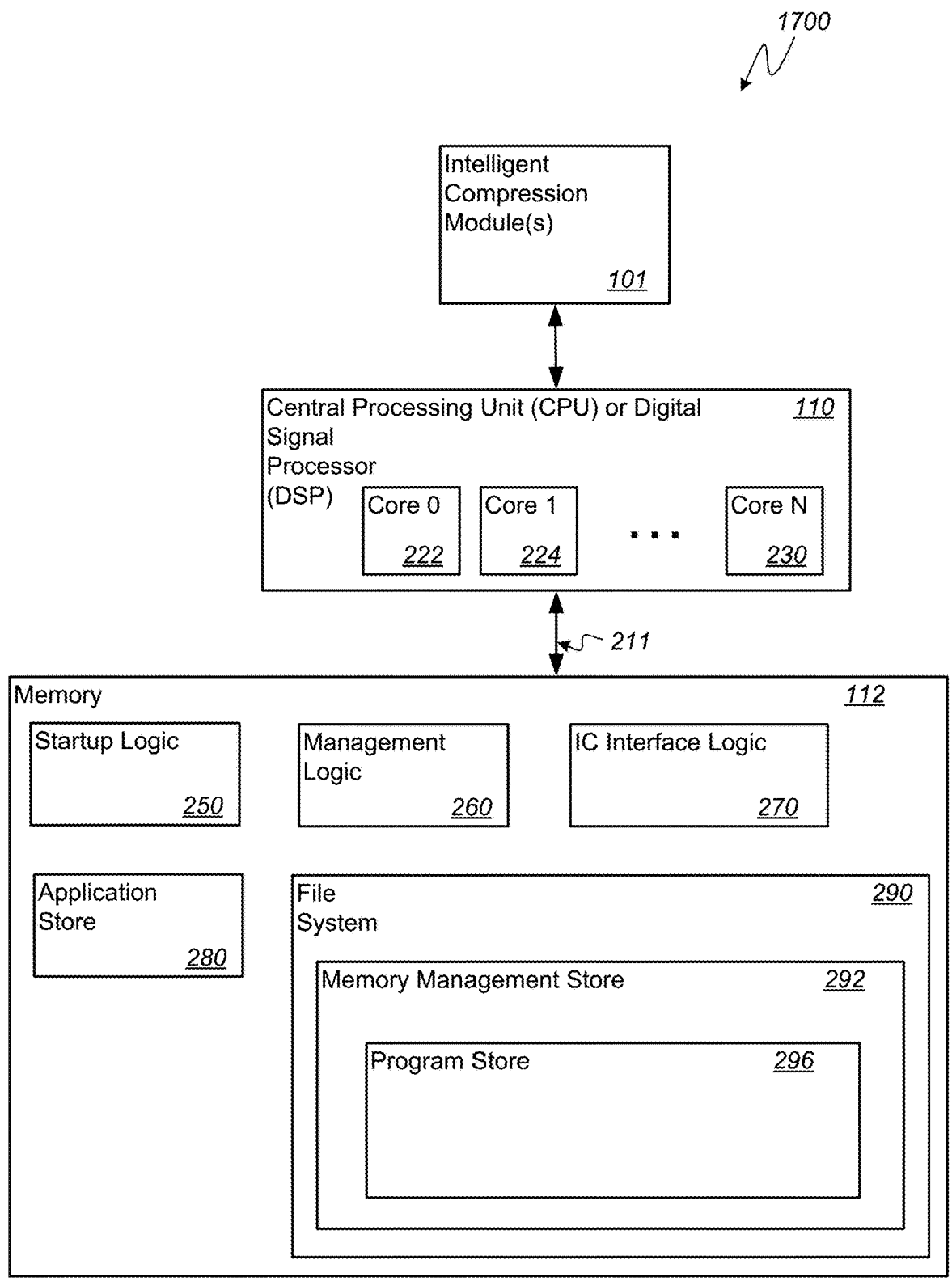
FIG. 17 is a schematic diagram illustrating an exemplary software architecture of the PCD of FIG. 16 for executing intelligent compression methodologies.

FIG. 17 is a schematic diagram 1700 illustrating an exemplary software architecture of the PCD of FIG. 16 for executing intelligent compression methodologies. As illustrated in FIG. 17, the CPU or digital signal processor 110 is coupled to the memory 112 via main bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs may be distributed for processing across two or more of the available cores.

The CPU 110 may receive commands from the IC module (s) 101 that may comprise software and/or hardware. If embodied as software, the module(s) 101 comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art and described above in the definitions. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 17, it should be noted that one or more of startup logic 250, management logic 260, IC interface logic 270, applications in application store 280 and portions of the file system 290 may be stored on any computer-readable medium for use by, or in connection with, any computer-related system or method.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the IC interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for intelligent compression. The startup logic 250 may identify, load and execute a select intelligent compression program. An exemplary select program may be found in the program store 296 of the embedded file system 290. The exemplary select program, when executed by one or more of the core processors in the CPU 110 may operate in accordance with one or more signals provided by the IC module 101 to implement intelligent compression methodologies.

The management logic 260 includes one or more executable instructions for terminating an IC program on one or more of the respective processor cores, as well as selectively identifying, loading, and executing a more suitable replacement program. The management logic 260 is arranged to perform these functions at run time or while the PCD 100 is powered and in use by an operator of the device. A replacement program may be found in the program store 296 of the embedded file system 290.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the compression factor associated with a particular type of compression algorithm used for sectors "Lx" and/or to the preferred sectored compression pattern.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 may be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged memory management store 292. In this regard, the file system 290 may include a reserved section of its total file system capacity for the storage of information for the configuration and management of the various IC algorithms used by the PCD 100.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Therefore, although selected aspects have been illustrated and described in detail, it will be understood that various substitutions and alterations may be made therein without departing from the spirit and scope of the present invention, as defined by the following claims.

What is claimed is:

1. A method for intelligent data compression in a portable computing device ("PCD"), the method comprising:
   determining a fixation point within an image frame by a fixation point sensor, wherein the fixation point sensor is configured to determine an area of user focus within a given image frame;
   sectoring the image frame into two or more sectors, wherein the two or more sectors comprises a fixation sector that includes the fixation point and one or more foveated sectors, each foveated sector does not include the fixation point, and each sector comprises a plurality of tiles;
   compressing the image frame such that the fixation sector is compressed according to a compression algorithm having a low compression factor and the one or more foveated sectors are compressed according to a compression algorithm having a high compression factor, wherein each respective tile within a particular foveated sector is subject to a different compression factor that is based on a distance between the fixation sector and the respective tile, each compression factor of a respective tile within a foveated sector having a magnitude that is assigned corresponding to the distance between the fixation sector and a respective tile; and
   storing the compressed image frame.

2. The method of claim 1, wherein the compression algorithm having a low compression factor is a lossless compression algorithm.

3. The method of claim 1, wherein the compression algorithm having a high compression factor is a lossy compression algorithm.

4. The method of claim 1, further comprising generating a compression map that adjusts a size of the foveated sectors.

5. The method of claim 4, wherein the size of the foveated sectors is based on knowledge of a latency factor associated with the fixation point sensor.

6. The method of claim 1, wherein sectoring the image frame into two or more sectors comprises arranging the sectors in a square-grid foveated-compression pattern.

7. The method of claim 1, wherein sectoring the image frame into two or more sectors comprises arranging the sectors in a cross-grid foveated-compression pattern.

8. The method of claim 1, wherein sectoring the image frame into two or more sectors comprises arranging the sectors in a honeycomb foveated-compression pattern.

9. A system for intelligent data compression in a portable computing device ("PCD"), the system comprising:
   an intelligent compression module, a monitor module, a fixation point sensor, and an image CODEC module collectively configured to:
      determine a fixation point within an image frame with the fixation point sensor, wherein the fixation point sensor determines an area of user focus within a given image frame;
      sector the image frame into two or more sectors, wherein the two or more sectors comprises a fixation sector that includes the fixation point and one or more foveated sectors, each foveated sector does not include the fixation point, and each sector comprises a plurality of tiles;
      compress the image frame such that the fixation sector is compressed according to a compression algorithm having a low compression factor and the one or more foveated sectors are compressed according to a compression algorithm having a high compression factor, wherein each respective tile within a particular foveated sector is subject to a different compression factor that is based on a distance between the fixation sector and the respective tile, each compression factor of a respective tile within a foveated sector having a magnitude that is assigned corresponding to the distance between the fixation sector and the respective tile; and
      store the compressed image frame.

10. The system of claim 9, wherein the compression algorithm having a low compression factor is a lossless compression algorithm.

11. The system of claim 9, wherein the compression algorithm having a high compression factor is a lossy compression algorithm.

12. The system of claim 9, wherein the intelligent compression module generates a compression map that adjusts a size of the foveated sectors.

13. The system of claim 12, wherein the size of the foveated sectors is based on knowledge of a latency factor associated with the fixation point sensor.

14. The system of claim 9, wherein sectoring the image frame into two or more sectors comprises arranging the sectors in a square-grid foveated-compression pattern.

15. The system of claim 9, wherein sectoring the image frame into two or more sectors comprises arranging the sectors in a cross-grid foveated-compression pattern.

16. The system of claim 9, wherein sectoring the image frame into two or more sectors comprises arranging the sectors in a honeycomb foveated-compression pattern.

17. A system for intelligent data compression in a portable computing device ("PCD"), the system comprising:
   means for determining a fixation point within an image frame comprising a fixation point sensor, wherein the fixation point sensor is configured to determine an area of user focus within a given image frame;
   means for sectoring the image frame into two or more sectors, wherein the two or more sectors comprises a fixation sector that includes the fixation point and one or more foveated sectors, each foveated sector does not include the fixation point, and each sector comprises a plurality of tiles;
   means for compressing the image frame such that the fixation sector is compressed according to a compression algorithm having a low compression factor and the one or more foveated sectors are compressed according to a compression algorithm having a high compression factor, wherein each respective tile within a particular foveated sector is subject to a different compression factor that is based on a distance between the fixation sector and the respective tile, each compression factor of a respective tile within a foveated sector having a magnitude that is assigned corresponding to the distance between the fixation sector and the respective tile; and
   means for storing the compressed image frame.

18. The system of claim 17, wherein the compression algorithm having a low compression factor is a lossless compression algorithm.

19. The system of claim 17, wherein the compression algorithm having a high compression factor is a lossy compression algorithm.

20. The system of claim 17, further comprising means for generating a compression map that adjusts a size of the foveated sectors.

21. The system of claim 20, wherein the size of the foveated sectors is based on knowledge of a latency factor associated with the fixation point sensor.

22. The system of claim 17, the means for sectoring the image frame into two or more sectors comprises means for arranging the sectors in a square-grid foveated-compression pattern.

23. The system of claim 17, wherein the means for sectoring the image frame into two or more sectors comprises means for arranging the sectors in a cross-grid foveated-compression pattern.

24. The system of claim 17, wherein the means for sectoring the image frame into two or more sectors comprises means for arranging the sectors in a honeycomb foveated-compression pattern.

25. A computer program product comprising a non-transitory computer usable medium having a computer readable program code embodied therein, said computer readable program code adapted to be executed to implement a method for intelligent data compression in a portable computing device ("PCD"), said method comprising:
   determining a fixation point within an image frame by a fixation point sensor, wherein the fixation point sensor is configured to determine an area of user focus within a given image frame;
   sectoring the image frame into two or more sectors, wherein the two or more sectors comprises a fixation sector that includes the fixation point and one or more foveated sectors, each foveated sector does not include the fixation point, and each sector comprises a plurality of tiles;
   compressing the image frame such that the fixation sector is compressed according to a compression algorithm having a low compression factor and the one or more foveated sectors are compressed according to a compression algorithm having a high compression factor, wherein each respective tile within a particular foveated sector is subject to a different compression factor that is based on a distance between the fixation sector and the respective tile, each compression factor of a respective tile within a foveated sector having a magnitude that is assigned corresponding to the distance between the fixation sector and the respective tile; and
   storing the compressed image frame.

26. The computer program product of claim 25, wherein the compression algorithm having a low compression factor is a lossless compression algorithm.

27. The computer program product of claim 25, wherein the compression algorithm having a high compression factor is a lossy compression algorithm.

28. The computer program product of claim 25, further comprising generating a compression map that adjusts a size of the foveated sectors.

29. The computer program product of claim 28, wherein the size of the foveated sectors is based on knowledge of a latency factor associated with the fixation point sensor.

30. The computer program product of claim 25, wherein sectoring the image frame into two or more sectors comprises arranging the sectors in a square-grid foveated-compression pattern.

31. The computer program product of claim 25, wherein sectoring the image frame into two or more sectors comprises arranging the sectors in a cross-grid foveated-compression pattern.

32. The computer program product of claim 25, wherein sectoring the image frame into two or more sectors comprises arranging the sectors in a honeycomb foveated-compression pattern.

* * * * *